(12) United States Patent
Imai et al.

(10) Patent No.: US 9,716,907 B2
(45) Date of Patent: Jul. 25, 2017

(54) UPDATING THIN-CLIENT DISPLAY BASED ON A THIN-OUT RATE

(71) Applicant: FUJITSU LIMITED, Kawasaki-shi (JP)

(72) Inventors: Tomoharu Imai, Kawasaki (JP); Kazuki Matsui, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 950 days.

(21) Appl. No.: 13/671,210

(22) Filed: Nov. 7, 2012

(65) Prior Publication Data
US 2013/0159393 A1 Jun. 20, 2013

(30) Foreign Application Priority Data

Dec. 20, 2011 (JP) ................................ 2011-278938

(51) Int. Cl.
*H04N 21/2662* (2011.01)
*G06F 3/14* (2006.01)
(Continued)

(52) U.S. Cl.
CPC ....... *H04N 21/2662* (2013.01); *G06F 3/0486* (2013.01); *G06F 3/1454* (2013.01);
(Continued)

(58) Field of Classification Search
CPC ...... H04W 4/021; G06F 15/16; G06F 3/1454; G06F 9/4445; G06F 2203/0383; H04L 43/00; H04L 12/26; H04L 21/2662
See application file for complete search history.

(56) References Cited

U.S. PATENT DOCUMENTS

| 6,270,040 B1 * | 8/2001 | Katzer .......................... 246/1 R |
| 2003/0025648 A1 * | 2/2003 | Glen ..................... G06F 3/1438 345/2.3 |

(Continued)

FOREIGN PATENT DOCUMENTS

| JP | 3-218512 | 9/1991 |
| JP | 2000-158727 | 6/2000 |

(Continued)

OTHER PUBLICATIONS

Tomoharu Imai et al., "An Adaptive Desktop Transfer Protocol for Mobile Thin Client", 2010, IEEE Globecom 2010 Workshop on Mobile Computing and Emerging Communication Networks; pp. 1136-1140.*

*Primary Examiner* — Jeffrey Nickerson
*Assistant Examiner* — Jihad Boustany
(74) *Attorney, Agent, or Firm* — Fujitsu Patent Center

(57) ABSTRACT

An information processing apparatus includes an image generation unit configured to generate an image that is changed according to operation commands received from a terminal and to be displayed at the terminal; a video-coding area determining unit configured to identify, in the image, a video-coding area that is changed within a predetermined period of time for a number of times greater than a first threshold and to be encoded according to a video compression format; an estimation unit configured to estimate a maximum data rate based on a round trip time of the network; a filtering unit configured to thin out the operation commands according to a thin-out rate when the operation commands are of a predetermined type and the estimated maximum data rate is less than a second threshold; and a threshold changing unit configured to change the first threshold based on the thin-out rate.

6 Claims, 17 Drawing Sheets

(51) Int. Cl.
  *G06F 9/44*       (2006.01)
  *H04N 21/647*    (2011.01)
  *H04N 21/478*    (2011.01)
  *H04N 21/6587*   (2011.01)
  *G06F 3/0486*    (2013.01)

(52) U.S. Cl.
  CPC ......... *G06F 9/4445* (2013.01); *H04N 21/478* (2013.01); *H04N 21/64738* (2013.01); *H04N 21/6587* (2013.01); *G06F 2203/0383* (2013.01)

(56) References Cited

U.S. PATENT DOCUMENTS

| | | | |
|---|---|---|---|
| 2006/0195800 A1 | 8/2006 | Tahara | |
| 2006/0206820 A1* | 9/2006 | Bullard et al. | 715/733 |
| 2006/0215750 A1* | 9/2006 | Izawa | 375/240.01 |
| 2006/0232447 A1* | 10/2006 | Walker et al. | 341/50 |
| 2009/0083752 A1* | 3/2009 | Wu et al. | 718/106 |
| 2010/0158000 A1* | 6/2010 | Muramoto et al. | 370/390 |
| 2010/0268828 A1* | 10/2010 | Pahlavan | G06F 9/4445 709/227 |
| 2011/0258339 A1* | 10/2011 | Matsui et al. | 709/236 |

FOREIGN PATENT DOCUMENTS

| | | |
|---|---|---|
| JP | 2006-236046 | 9/2006 |
| JP | 2009-075808 | 4/2009 |

* cited by examiner

FIG.4
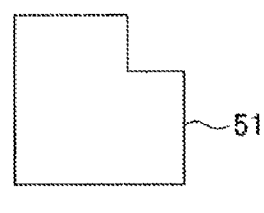
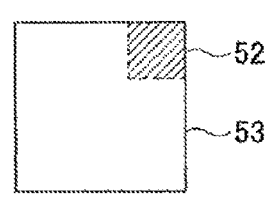
FIG.5
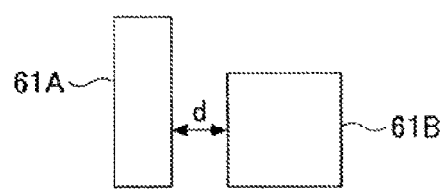
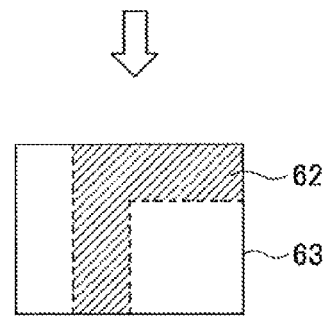

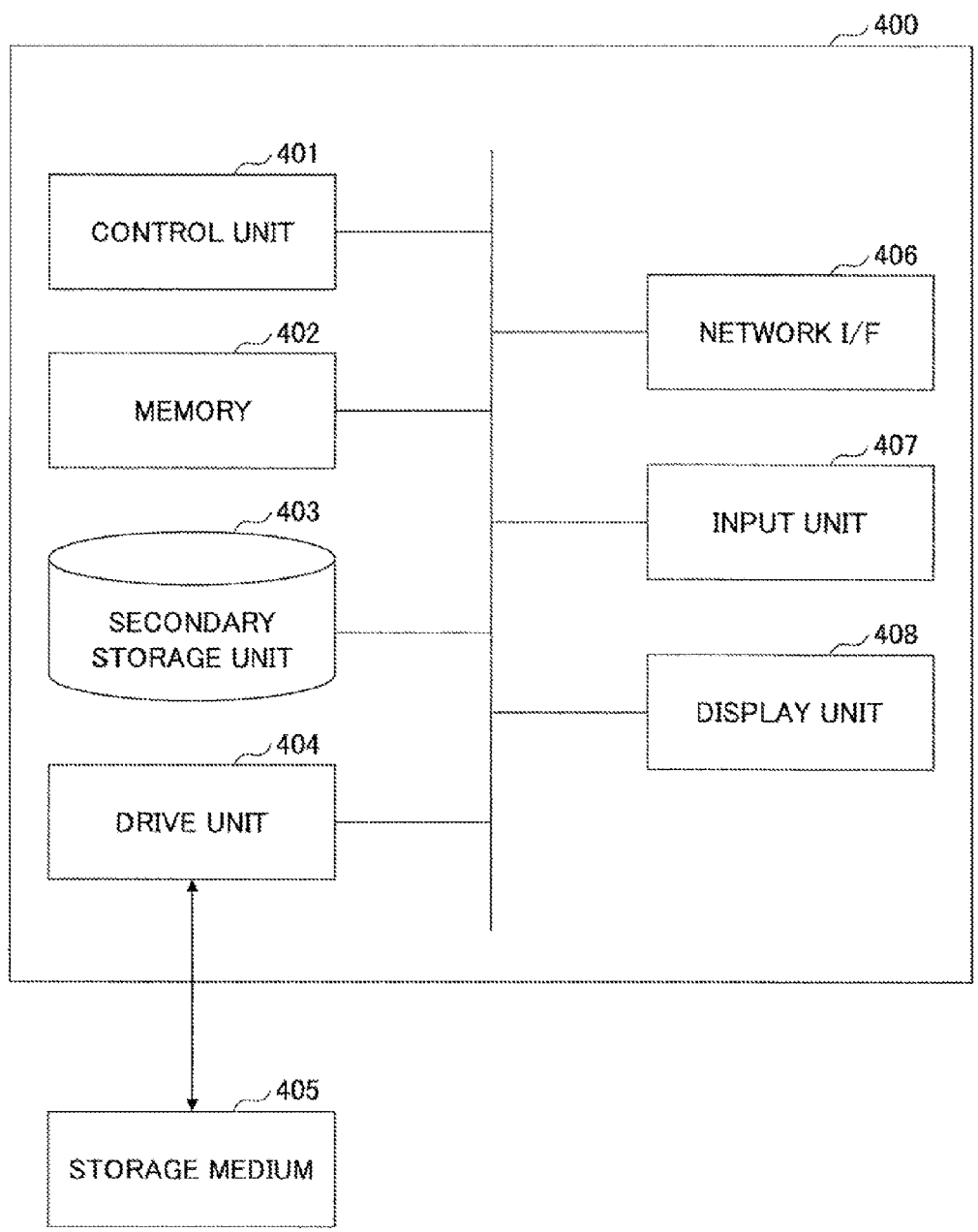

UPDATING THIN-CLIENT DISPLAY BASED ON A THIN-OUT RATE

CROSS-REFERENCE TO RELATED APPLICATION

This application is based upon and claims the benefit of priority of Japanese Patent Application No. 2011-278938 filed on Dec. 20, 2011, the entire contents of which are incorporated herein by reference.

FIELD

An aspect of this disclosure relates to an information processing apparatus, an information processing method, and a storage medium.

BACKGROUND

"Thin client" technologies are commonly used to prevent information leaks and to reduce operation and maintenance costs of personal computers (PCs). In a thin client system, clients have minimum functions and a server manages resources such as applications and files.

In such a thin client system, although the server actually executes processes and causes the clients to display the results of the processes and data stored in the server, it appears as if the clients themselves execute the processes and store the data.

For example, in a thin client system, a server executes business applications such as a word processor and a mailer, and causes clients to display the processing results of the business applications. Here, it is desired to use a wider range of applications in a thin client system in addition to business applications as described above. Examples of such applications include an application (e.g., a computer-aided design (CAD) application) for processing detailed images and an application for processing videos.

However, when large-volume data such as images and videos are transmitted via a protocol such as a Remote Desktop Protocol (RDP) or a Remote Frame Buffer (RFB) protocol for Virtual Network Computing (VNC) used for communications in a thin client system, the response time of operations performed at clients increases. This problem occurs not only in processes involving transmission of images and videos, but in any process involving transmission of high-volume data for screen updates between a client and a server in a thin client system.

Japanese Laid-Open Patent Publication No. 2006-236046 discloses a technology where a server generates a current pointer (or key input information) when a delay occurs at the server and sends the generated current pointer as screen data to a client to allow the user to determine the cause of the delay at the client.

Japanese Laid-Open Patent Publication No. 2009-075808 discloses a technology where events are filtered based on the number of operations and time intervals and combined based on their types to reduce the number of events and thereby enable a server to efficiently process a large number of events.

Japanese Laid-Open Patent Publication No. 03-218512 discloses a technology where some mouse movement events are removed at a predetermined rate to reduce the load of draw processing when a large number of mouse movement commands are generated. Japanese Laid-Open Patent Publication No. 2000-158727 discloses a technology for an image output system where a threshold for determining whether to perform pre-rendering for a current process is changed according to a period of time taken for a previous rendering process.

SUMMARY

According to an aspect of the invention, there is provided an information processing apparatus that is connected via a network to a terminal. The information processing apparatus includes an image generation unit configured to generate an image that is changed according to operation commands received from the terminal and to be displayed at the terminal; a video-coding area determining unit configured to identify, in the image, a video-coding area that is changed within a predetermined period of time for a number of times greater than a first threshold and to be encoded according to a video compression format; an estimation unit configured to estimate a maximum data rate based on a round trip time of the network between the information processing apparatus and the terminal; a filtering unit configured to thin out the operation commands according to a thin-out rate when the operation commands are of a predetermined type and the estimated maximum data rate is less than a second threshold; and a threshold changing unit configured to change the first threshold based on the thin-out rate when the operation commands of the predetermined type are thinned out.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a drawing used to describe an exemplary method of correcting a mesh cell aggregate;

FIG. 5 is a drawing used to describe an exemplary method of combining frequently-changed area candidates;

FIG. 17 is a block diagram illustrating an exemplary configuration of an information processing apparatus.

DESCRIPTION OF EMBODIMENTS

With the related-art technologies described above, it is difficult to reduce the processing load of a server and reduce the amount of data to be transmitted without degrading the responsiveness of a thin client system. For example, when commands that cause frequent screen updates are processed in sequence, it may be possible to reduce the processing load by thinning out the commands (i.e., removing some of the commands). Still, however, if a large amount of data needs to be transmitted to update the screen, the responsiveness of a thin client system is degraded.

An aspect of this disclosure provides an information processing apparatus, an information processing method, and a storage medium that make it possible to reduce the processing load of a server and reduce the amount of data to be transmitted without degrading the responsiveness of a thin client system. Preferred embodiments of the present invention are described below with reference to the accompanying drawings.

First Embodiment

<System>

Figure 1:
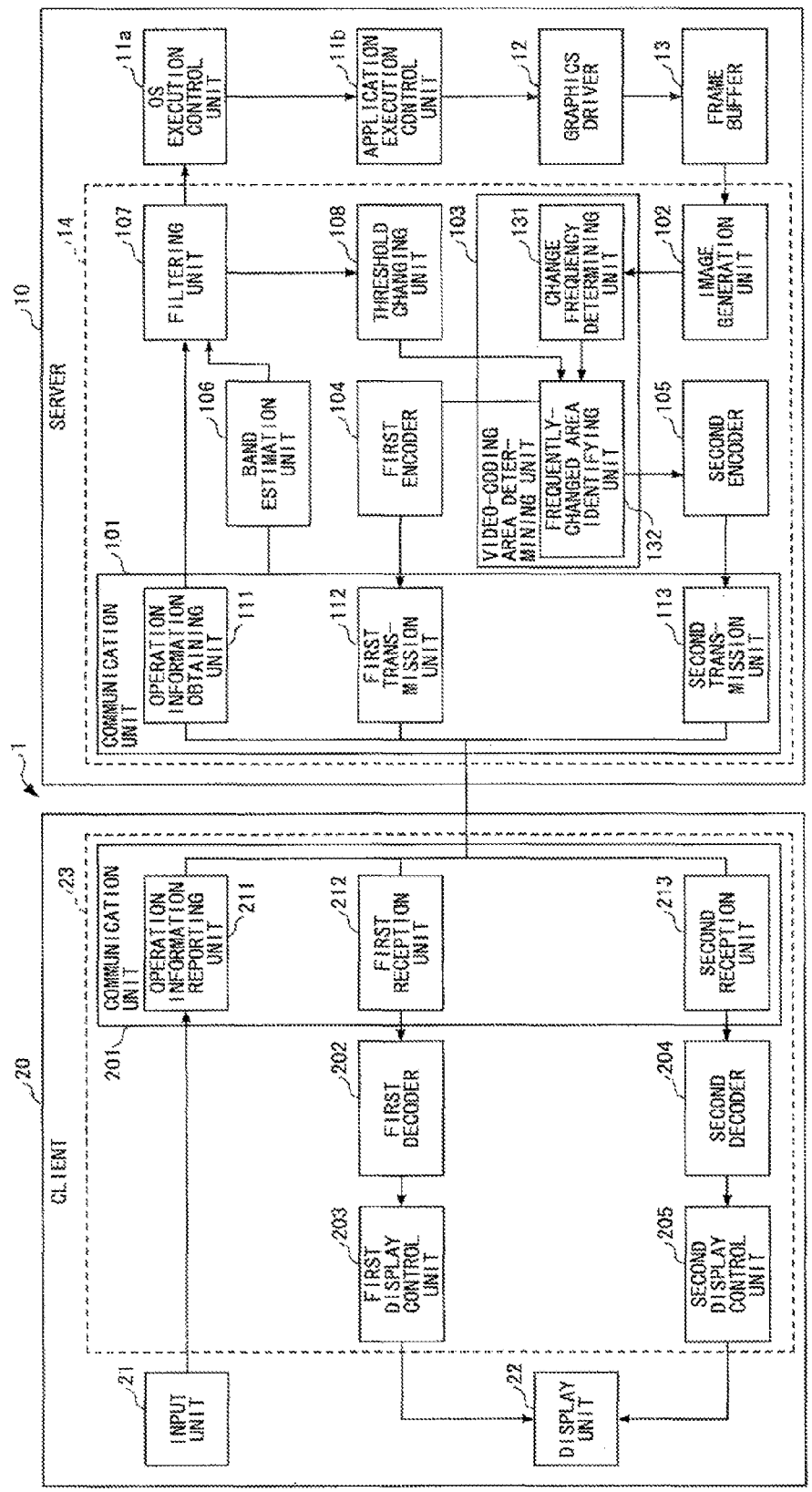
FIG. 1 is a block diagram illustrating exemplary configurations of a server and a client in a thin client system according to a first embodiment.

A thin client system according to a first embodiment is described below. FIG. 1 is a block diagram illustrating exemplary configurations of a server 10 and a client 20 in a thin client system 1 according to the first embodiment.

In the thin client system 1, the server 10 remotely controls screens displayed by the client 20. The server 10 and the client 20 may be implemented, for example, by information processing apparatuses.

In the thin client system 1, although the server 10 actually executes processes and causes the client 20 to display the results of the processes and data stored in the server 10, it appears as if the client 20 itself executes the processes and stores the data.

In the example of FIG. 1, the thin client system 1 includes one server 10 and one client 20. However, two or more clients 20 may be connected to one server 10, and two or more servers 10 may be provided in the thin client system 1.

The server 10 and the client 20 are connected to each other via a network so as to be able to communicate with each other. The network may be implemented by any type of wired or wireless network such as the Internet, a local area network (LAN), or a virtual private network (VPN). In the present embodiment, it is assumed that the Remote Frame Buffer (RFB) protocol for Virtual Network Computing (VNC) is used for communications between the server 10 and the client 20.

The server 10 is a computer that provides a service for remotely controlling screens displayed by the client 20. A server application for remote screen control is installed or preinstalled in the server 10. Hereafter, the server application for remote screen control is referred to as a "server-side remote screen control application".

The server-side remote screen control application includes a function that provides a remote screen control service. For example, the server-side remote screen control application obtains operation information indicating an operation performed at the client 20 and causes the corresponding application running on the server 10 to perform a process requested by the operation.

The server-side remote screen control application generates an image of a screen for displaying the result of the process performed by the application and transmits the generated image to the client 20. More specifically, the server-side remote screen control application determines parts of the generated image that are different from a bitmap image previously displayed at the client 20, and transmits a rectangular update image formed by combining pixels of the determined parts to the client 20. In the present embodiment, it is assumed that an update image has a rectangular shape. However, this disclosure may also be applied to a case where an update image has a shape other than a rectangular shape.

The server-side remote screen control application may also include a function to compress data of a part of an image that greatly changes between frames according to a video compression format (algorithm or standard) and transmit the compressed data to the client 20. For example, the server-side remote screen control application divides an image of a screen generated based on a result of a process performed by an application into multiple areas and monitors the change frequency of each of the areas.

In this case, the server-side remote screen control application transmits, to the client 20, attribute information of a frequently-changed area whose change frequency has exceeded a threshold. Also, the server-side remote screen control application encodes the bitmap image of the frequently-changed area according to an MPEG (Moving Picture Experts Group) format such as MPEG-2 or MPEG-4, and transmits the encoded bitmap image to the client 20.

The compression format used for this purpose is not limited to an MPEG format. For example, any other video compression format such as the Motion-JPEG (Joint Photographic Experts Group) format may be used.

Further, the server-side remote screen control application estimates a maximum data rate based on round trip time (RTT), and thins out (i.e., removes some of) operation commands that cause frequent screen updates based on the estimated maximum data rate. In addition, the server-side remote screen control application changes the threshold used to determine a frequently-changed area based on the rate (thin-out rate) of removing operation commands.

The client 20 is a computer that receives the remote screen control service provided by the server 10. The client 20 may be implemented, for example, by a fixed terminal such as a personal computer (PC) or by a mobile terminal such as a mobile phone, a Personal Handy-phone System (PHS) phone, or a personal digital assistant (PDA).

A client application for remote screen control is installed or preinstalled in the client 20. Hereafter, the client application for remote screen control is referred to as a "client-side remote screen control application".

The client-side remote screen control application reports operation information indicating operations received via input devices such as a mouse and a keyboard to the server 10. For example, the client-side remote screen control application reports operation information indicating a right click, a left click, a double click, or dragging of the mouse, or the amount of movement of a mouse cursor obtained based on a moving operation of the mouse. As another example, the client-side remote screen control application may report operation information indicating the amount of rotation of a mouse wheel or the type of a key pressed on the keyboard.

The client-side remote screen control application includes a function for displaying an image received from the server 10 on a display unit. For example, when receiving a rectangular update image from the server 10, the client-side remote screen control application displays the rectangular update image at a position where a change from the previously displayed bitmap image is detected.

As another example, when receiving attribute information of a frequently-changed area from the server 10, the client-side remote screen control application sets an area on the display screen corresponding to a position in the attribute information as a blank area where no bitmap image is to be displayed. Then, when receiving data in a video compression format, the client-side remote screen control application decodes the data and displays the decoded data in the blank area.

<Configuration of Server>

Next, an exemplary configuration of the server 10 of the first embodiment is described. As illustrated in FIG. 1, the server 10 may include an OS execution control unit 11*a*, an application execution control unit 11*b*, a graphics driver 12, a frame buffer 13, and a server-side remote screen control unit 14. The server 10 may also include other functional units such as input units (or devices) and display units (or devices) that a known computer normally includes.

The OS execution control unit 11*a* controls execution of an operating system (OS). The OS execution control unit 11*a* detects start instructions and commands for applications based on operation information obtained by an operation information obtaining unit 111 (described later). For example, when a double click on an icon of an application is detected, the OS execution control unit 11*a* requests the application execution control unit 11*b* to start the application.

As another example, when an operation to request execution of a command is detected on an operation screen or a window of a running application, the OS execution control unit 11*a* requests the application execution control unit 11*b* to execute the command.

The application execution control unit 11*b* controls execution of applications based on instructions or requests from the OS execution control unit 11*a*. For example, when requested by the OS execution control unit 11*a* to start an application or to execute a command of a running application, the application execution control unit 11*b* starts the application or executes the command.

The application execution control unit 11*b* requests the graphics driver 12 to draw a display image for displaying a result of executing an application in the frame buffer 13 (hereafter, this request may be referred to as a "drawing request"). When requesting the graphics driver 12 to draw a display image, the application execution control unit 11*b* inputs the display image and a drawing position of the display image to the graphics driver 12.

Applications to be executed by the application execution control unit 11*b* may be pre-installed in the server 10 or installed in the server after shipment. Also, applications such as JAVA (registered trademark) applications that run in a network environment may be executed by the application execution control unit 11*b*.

The graphics driver 12 draws images in the frame buffer 13. For example, when receiving a drawing request from the application execution control unit 11*b*, the graphics driver 12 draws, in a bitmap format, a display image for displaying a processing result of an application at a drawing position in the frame buffer 13 specified by the application.

In the above descriptions, the graphics driver 12 receives a drawing request from the application execution control unit 11*b*. However, the graphics driver 12 may also receive a drawing request from the OS execution control unit 11*a*. For example, when receiving a drawing request for drawing a mouse cursor from the OS execution control unit 11*a*, the graphics driver 12 draws, in a bitmap format, a display image for displaying the mouse cursor at a drawing position in the frame buffer 13 specified by the OS.

The frame buffer 13 is a storage device that stores bitmap data drawn by the graphics driver 12. The frame buffer 13 may be implemented, for example, by a semiconductor memory device such as a random access memory (RAM) (e.g., a video random access memory (VRAM)), a read-only memory (ROM), or a flash memory. Also, the frame buffer 13 may be implemented by a storage medium such as a hard disk or an optical disk.

The server-side remote screen control unit 14 provides a remote screen control service to the client 20 via the server-side remote screen control application. As illustrated in FIG. 1, the server-side remote screen control unit 14 may include a communication unit 101, an image generation unit 102, a video-coding area determining unit 103, a first encoder 104, a second encoder 105, a band estimation unit 106, a filtering unit 107, and a threshold changing unit 108.

The communication unit 101 performs data communications with the client 20. The communication unit 101 may include an operation information obtaining unit 111, a first transmission unit 112, and a second transmission unit 113. The video-coding area determining unit 103 determines, in an image generated by the image generation unit 102, an area (hereafter referred to as a "video-coding area") to be encoded according to a video compression format. The video-coding area determining unit 103 may include a change frequency determining unit 131 and a frequently-changed area identifying unit 132.

The operation information obtaining unit (receiving unit) 111 obtains operation information from the client 20. For example, operation information may indicate a right click, a left click, a double click, or dragging of the mouse, or the amount of movement of a mouse cursor obtained based on a moving operation of the mouse. Also, operation information may indicate the amount of rotation of a mouse wheel or the type of a key pressed on the keyboard.

The image generation unit 102 generates an image of a screen to be displayed on a display unit 22 of the client 20. For example, each time the graphics driver 12 stores bitmap data in the frame buffer 13, the image generation unit 102 performs a process as described below.

The image generation unit 102 compares a display screen image of the previous frame displayed by the client 20 and a display screen image written into the frame buffer 13 for the current frame. Then, the image generation unit 102 determines parts of the display screen image that have been changed from the previous frame, generates a rectangular update image by combining pixels of the determined parts and shaping the combined pixels into a rectangle, and generates a packet for transmitting the rectangular update image.

<Basic Process>

A process for identifying a frequently-changed area in an image independent of particular applications is described below. The frequently-changed area is to be encoded according to a video compression format. This process may be referred to as a basic process of the server 10.

The change frequency determining unit 131 determines the change frequency of each of areas of an image drawn in the frame buffer 13. For example, the change frequency determining unit 131 accumulates rectangular update images generated by the image generation unit 102 in an internal working memory (not shown) for a predetermined period of time.

More specifically, the change frequency determining unit 131 accumulates attribute information for identifying the positions and sizes of rectangular update images. For example, the attribute information of a rectangular update image may include the coordinates of the upper left vertex and the width and height of the rectangular update image. The period of time for accumulating rectangular update images affects the accuracy of identifying frequently-changed areas. As the period of time increases, the probability of false detection of frequently-changed areas decreases. In the present embodiment, it is assumed that rectangular update images are accumulated for one second.

When the predetermined period of time passes after starting accumulation of rectangular update images, the change frequency determining unit 131 determines the change frequency of a display screen to be displayed at the client 20 using a map obtained by dividing the display screen into a mesh.

Figure 2:
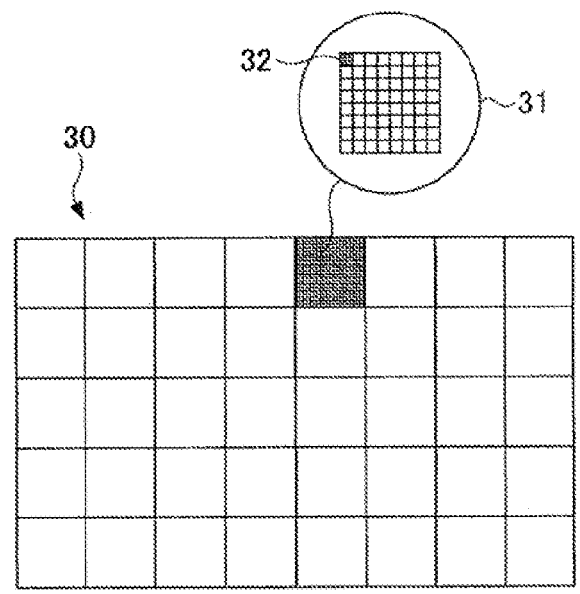
FIG. 2 is a drawing illustrating an example of a map.

FIG. 2 is a drawing illustrating an exemplary map 30 used to determine the change frequency of a display screen. The map 30 includes mesh cells 31. Each mesh cell 31 includes pixels 32. In the example of FIG. 2, it is assumed that the change frequency determining unit 131 divides the display screen into the mesh cells 31 each consisting of 8×8 pixels. Accordingly, each mesh cell 31 includes 64 pixels.

According to the positions and sizes of rectangular update images accumulated in the internal work memory, the change frequency determining unit 131 sequentially lays out the rectangular update images on the map 30. When laying out each rectangular update image on the map 30, the change frequency determining unit 131 increases the change count (which indicates the number of times a mesh cell has been changed) of each mesh cell 31 that overlaps the laid-out rectangular update image.

More specifically, when a rectangular update image laid-out on the map 30 overlaps a predetermined number of pixels or more of a mesh cell 31, the change frequency determining unit 131 increases the change count of the mesh cell 31 by one. Here, it is assumed that the change count of a mesh cell is increased when a laid-out rectangular update image overlaps one or more pixels of the mesh cell.

Figure 3A:
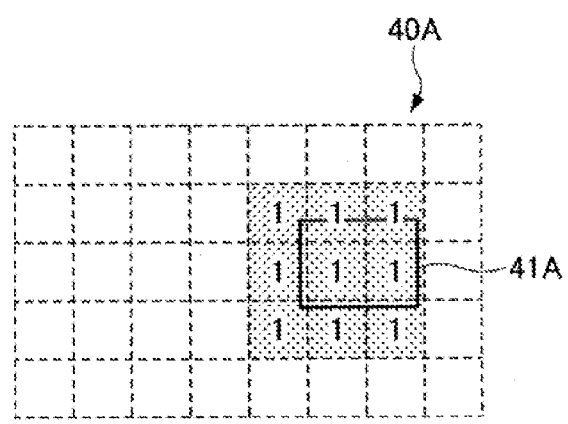
FIG. 3A is a drawing used to describe an exemplary method of determining the change frequency of a display screen.
Figure 3B:
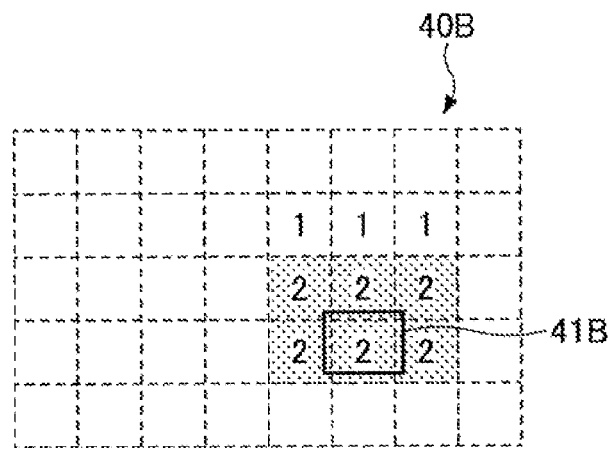
FIG. 3B is a drawing used to describe an exemplary method of determining the change frequency of a display screen.
Figure 3C:
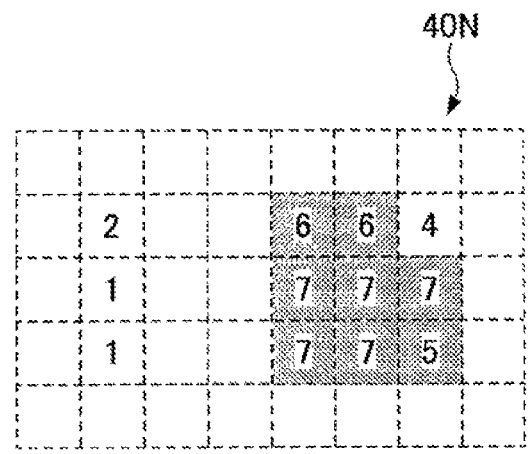
FIG. 3C is a drawing used to describe an exemplary method of determining the change frequency of a display screen.

FIGS. 3A through 3C are drawings used to describe an exemplary method of determining the change frequency of a display screen. FIGS. 3A, 3B, and 3C, respectively, illustrate maps 40A, 40B, and 40N used to determine the change frequency of a display screen. In FIGS. 3A and 3B, reference numbers 41A and 41B indicate rectangular update images. In FIG. 3A, numbers in the mesh cells of the map 40A indicate the change counts of the mesh cells at the time when the rectangular update image 41A is laid out.

In FIG. 3B, numbers in the mesh cells of the map 40B indicate the change counts of the mesh cells at the time when the rectangular update image 41B is laid out. In FIG. 3C, numbers in the mesh cells of the map 40N indicate the change counts of the mesh cells after all of the rectangular update images accumulated in the internal work memory are laid out. In FIGS. 3A through 3C, the change counts of mesh cells where no number is illustrated are assumed to be zero.

As illustrated in FIG. 3A, the rectangular update image 41A laid out on the map 40A overlaps shaded mesh cells. Therefore, the change frequency determining unit 131 increases the change counts of the shaded mesh cells by one. In this example, it is assumed that the current change counts of the mesh cells are zero, and therefore the change counts of the shaded mesh cells are increased to "1".

As illustrated in FIG. 3B, the rectangular update image 41B laid out on the map 40B overlaps shaded mesh cells. Therefore, the change frequency determining unit 131 increases the change counts of the shaded mesh cells by one. In this case, since the current change counts of the shaded mesh cells are "1", the change counts of the shaded mesh cells are increased to "2". Here, it is assumed that the change counts of the mesh cells become as illustrated in FIG. 3C after all of the accumulated rectangular update images are laid out on the map.

After laying out all of the rectangular update images accumulated in the internal work memory, the change frequency determining unit 131 identifies mesh cells whose change counts or change frequencies within a predetermined period of time are greater than a threshold. In the example of FIG. 3C, assuming that the threshold is "4", shaded meshes in the map 40N are identified.

Increasing the value of the threshold makes it possible to more accurately identify an area of the display screen where a video is to be displayed and to encode an image corresponding to the area by the second encoder 105. The threshold may be selected by the end user from a series of thresholds set by the developer of the server-side remote screen control application, or may be set freely by the end user.

Referring back to FIG. 1, the frequently-changed area identifying unit 132 identifies a frequently-changed area of the display screen to be displayed at the client 20.

When mesh cells whose change counts within a predetermined period of time are greater than a threshold (first threshold) are identified by the change frequency determining unit 131, the frequently-changed area identifying unit 132 combines adjacent mesh cells into a mesh cell aggregate and corrects the mesh cell aggregate into a rectangular shape. The predetermined period of time may be set at, for example, five seconds. For example, the frequently-changed area identifying unit 132 obtains a supplemental area for supplementing the mesh cell aggregate and adds the supplemental area to the mesh cell aggregate to correct the mesh cell aggregate into a rectangular shape. The supplemental area may be obtained by using an algorithm that can generate a minimum area that is sufficient to shape a mesh cell aggregate into a rectangle.

FIG. 4 is a drawing used to describe an exemplary method of correcting a mesh cell aggregate. In FIG. 4, a reference number 51 indicates a mesh cell aggregate before correction, a reference number 52 indicates a supplemental area, and a reference number 53 indicates a rectangular image obtained by correcting the mesh cell aggregate 51. As illustrated in FIG. 4, the frequently-changed area identifying unit 132 adds the supplemental area 52 to the mesh cell aggregate 51 to obtain the rectangular image 53. At this stage, the rectangular image 53 has not been determined to be a frequently-changed area and is therefore referred to as a "frequently-changed area candidate".

When there are plural frequently-changed area candidates, the frequently-changed area identifying unit 132 combines frequently-changed area candidates that are apart from each other by a distance less than or equal to a predetermined value to form a rectangular image. Here, the distance indicates the shortest distance between frequently-changed area candidates.

For example, the frequently-changed area identifying unit 132 obtains a supplemental area for filling a gap between frequently-changed area candidates and combines the frequently-changed area candidates and the supplemental area to form a rectangular image. The supplemental area may be obtained by using an algorithm that can generate a minimum area that is sufficient to fill a gap between frequently-changed area candidates to form a rectangular image.

FIG. 5 is a drawing used to describe an exemplary method of combining frequently-changed area candidates. In FIG. 5, reference numbers 61A and 61B indicate frequently-changed area candidates, a reference number 62 indicates a supplemental area, and a reference number 63 indicates a combined image obtained by combining the frequently-changed area candidates 61A and 61B.

As illustrated in FIG. 5, the frequently-changed area identifying unit 132 combines the frequently-changed area candidates 61A and 61B and the supplemental area 62 to obtain the combined image 63. The frequently-changed area identifying unit 132 identifies the combined image 63 as a frequently-changed area.

When a frequently-changed area is identified as described above, the frequently-changed area identifying unit 132 outputs attribute information indicating the position and size of the frequently-changed area to the first transmission unit 112 and the second transmission unit 113.

The attribute information of the frequently-changed area is used to cause the client 20 to blank out a part of bitmap data of the display screen corresponding to the frequently-changed area. Then, the frequently-changed area identifying unit 132 clears the change counts of mesh cells mapped to an internal work memory. The frequently-changed area identifying unit 132 registers the attribute information of the frequently-changed area in the internal work memory.

Figure 6A:
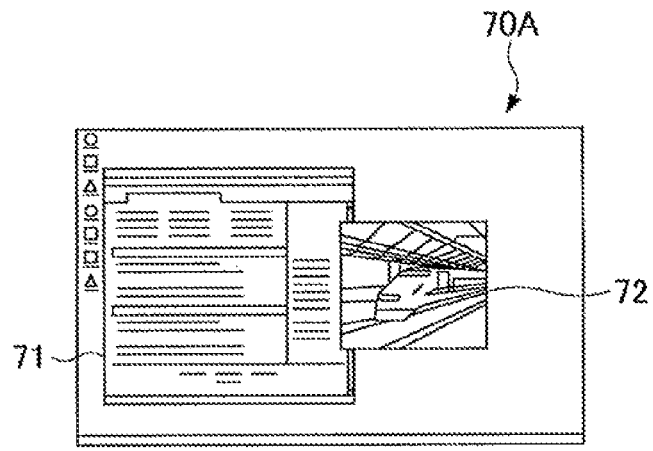
FIG. 6A is a drawing used to describe an exemplary method of reporting attribute information of a frequently-changed area.
Figure 6B:
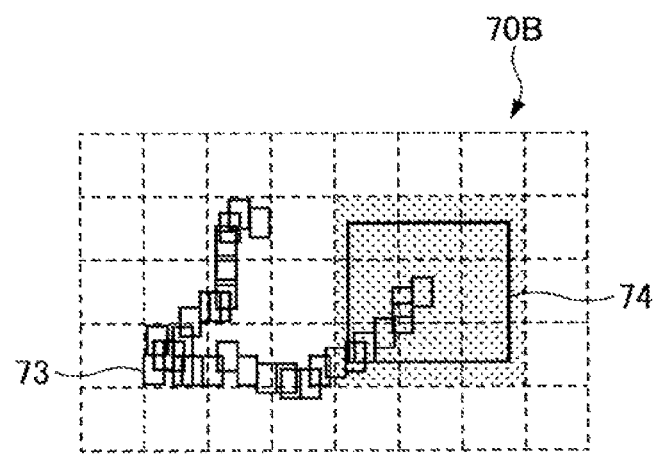
FIG. 6B is a drawing used to describe an exemplary method of reporting attribute information of a frequently-changed area.
Figure 6C:
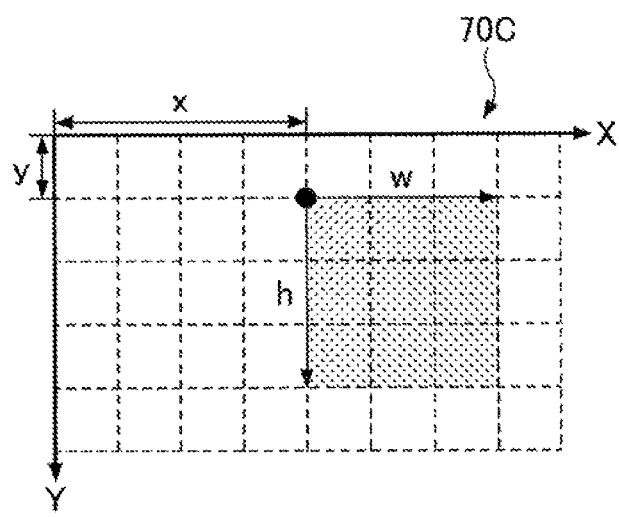
FIG. 6C is a drawing used to describe an exemplary method of reporting attribute information of a frequently-changed area.

FIGS. 6A through 6C are drawings used to describe an exemplary method of reporting attribute information of a frequently-changed area. In FIG. 6A, a reference number 70A indicates an exemplary display screen drawn in the frame buffer 13, a reference number 71 indicates a browser screen, and a reference number indicates a video playback screen. In FIG. 6B, a reference number 70B indicates a map used to determine the change frequency of the display screen 70A, a reference number 73 indicates a mouse trail (movement of a mouse), and a reference number 74 indicates a video playback area. In FIG. 6C, a reference number 70C indicates a map used to determine the change frequency of the display screen 70A.

As illustrated in FIG. 6A, the display screen 70A includes the browser screen 71 and the video playback screen 72. FIG. 6B indicates changes over time in the display screen 70A. In FIG. 6B, no rectangular update image is generated for the browser screen 71 that is a still image, but rectangular update images for the mouse trail 73 and the video playback area 74 are generated.

Here, it is assumed that the change counts of shaded mesh cells corresponding to the video playback area 74 are greater than a threshold and those shaded mesh cells have been identified by the frequently-changed area identifying unit 132 as a frequently-changed area. In this case, the frequently-changed area identifying unit 132 outputs attribute information including the coordinates (x, y) of the upper left vertex of the frequently-changed area (shaded area) and a width w and a height h of the frequently-changed area (see FIG. 6C) to the first transmission unit 112 and the second transmission unit 113.

Although the upper-left vertex is used in the above example to indicate the position of a frequently-changed area, any other vertex may be used for this purpose. Also, any point other than a vertex, e.g., a barycenter, may be used to indicate the position of a frequently-changed area. In the example of FIG. 6C, the origin of the X and Y coordinate axes is set at the upper left corner of the display screen. However, the origin of the X and Y coordinate axes may be set at any point inside or outside of the display screen.

Each time a rectangular update image is generated by the image generation unit 102, the frequently-changed area identifying unit 132 determines whether the rectangular update image is included in a frequently-changed area stored in the internal work memory, i.e., in a video area being transmitted by the second transmission unit 113.

When the rectangular update image is not included in the frequently-changed area, the frequently-changed area identifying unit 132 outputs the rectangular update image and attribute information including the position and size of the rectangular update image to the first encoder 104. Meanwhile, when the rectangular update image is included in the frequently-changed area, the frequently-changed area identifying unit 132 basically does not cause the rectangular update image to be transmitted from the first transmission unit 112. Exceptionally, when the rectangular update image included in the frequently-changed area corresponds to a mouse cursor drawn by the OS execution control unit 11a, the frequently-changed area identifying unit 132 may cause the rectangular update image and its attribute information to be transmitted from the first transmission unit 112.

Each time bitmap data are drawn in the frame buffer 13, the frequently-changed area identifying unit 132 determines whether attribute information of a frequently-changed area is registered in the internal work memory.

When attribute information of a frequently-changed area is registered in the internal work memory, the frequently-changed area identifying unit 132 cuts out a part of the bitmap data corresponding to the frequently-changed area in the frame buffer 13 and outputs the cut-out part of the bitmap data to the second encoder 105.

The first encoder 104 encodes rectangular update images input from the frequently-changed area identifying unit 132 according to a still-image compression format. For example, the first encoder 104 encodes a rectangular update image according to a JPEG format to generate encoded still-image data (encoded data of the rectangular update image). Although a JPEG format is used here as a still-image compression format, any other compression format such as Graphics Interchange Format (GIF) or Portable Network Graphics (PNG) may also be used for this purpose.

The first transmission unit 112 transmits the encoded data of the rectangular update image output from the first encoder 104 to the client 20. For example, when transmitting the encoded data of the rectangular update image to the client 20, the first transmission unit 112 adds header information including a frame ID and a time stamp indicating transmission time to the encoded data.

The first transmission unit 112 may add header information to all sets of the encoded data of rectangular update images output from the first encoder 104. However, this is not always necessary, and the first transmission unit 112 may add header information to at least one of the sets of encoded data from the first encoder 104. The header information may also include attribute information of a rectangular update image and/or a frequently-changed area. For example, the Remote Frame Buffer (RFB) protocol for Virtual Network Computing (VNC) may be used as a communication protocol for transmitting rectangular update images (or encoded data of rectangular update images).

The second encoder 105 encodes images of a frequently-changed area input from the frequently-changed area identifying unit 132 according to a video compression format. For example, the second encoder 105 encodes images of a frequently-changed area according to an MPEG format to generate encoded video data. Although an MPEG format is used here as a video compression format, any other compression format such as Motion-JPEG may be used for this purpose.

The second transmission unit 113 transmits encoded video data output from the second encoder 105 to the client 20. For example, the second transmission unit 113 adds header information to at least one of plural sets of encoded video data output from the second encoder 105. The header information may include attribute information of a frequently-changed area. For example, the Real-time Transport Protocol (RTP) may be used as a communication protocol for transmitting encoded video data of a frequently-changed area.

With the above configuration, the server 10 transmits update images for areas other than frequently-changed areas and transmits data compressed according to a video compression format for frequently-changed areas. This configuration makes it possible to reduce the amount of data transmitted to the client 20 and thereby makes it possible to improve the responsiveness of a thin client system. Also, reducing the amount of data transmitted to the client 20 makes it possible to reduce transmission delays between the server 10 and the client 20, and thereby makes it possible to reduce the probability that image frames to be displayed at the client 20 are dropped.

<Command Filtering and Threshold Changing Process>

Next, a command filtering (thinning-out) and threshold changing process performed by the server 10 is described.

Figure 7:
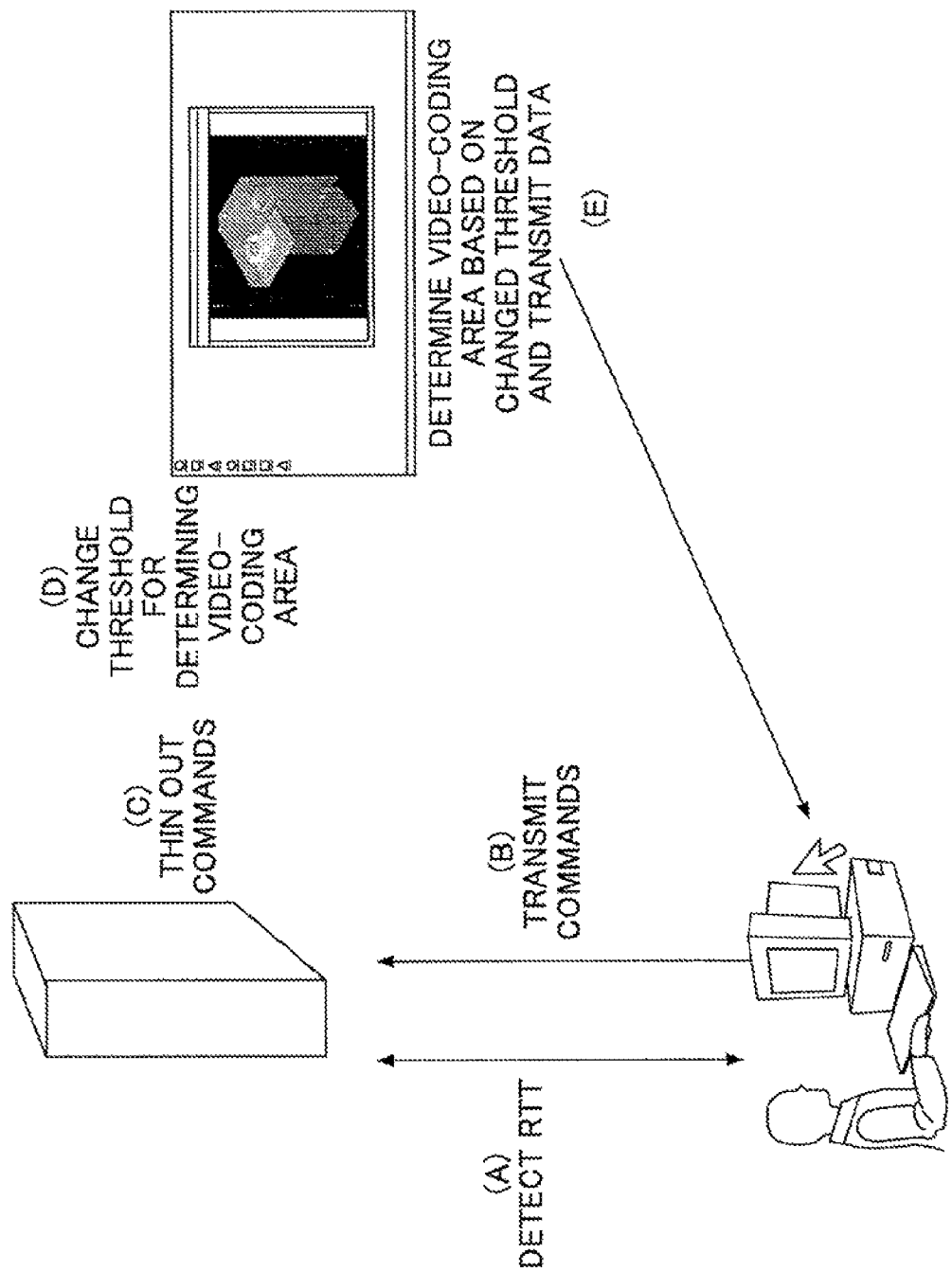
FIG. 7 is a drawing used to describe the outlines of a command filtering and threshold changing process.

FIG. 7 is a drawing used to describe the outlines of the command filtering and threshold changing process. As illustrated in FIG. 7, the command filtering and threshold changing process roughly include five steps.

(A) The server 10 detects the RTT between the server 10 and the client 20 and estimates a theoretical maximum data rate of the network based on the RTT.

(B) The client 20 transmits commands generated by user operations of the mouse at the client 20 to the server 10.

(C) The server 10 thins out commands (i.e., removes some of the commands) of a predetermined type based on the maximum data rate.

(D) The server 10 changes the threshold for determining a video-coding area (frequently-changed area) based on a thin-out rate used to thin out the commands.

(E) The server 10 determines a video-coding area based on the changed threshold and transmits data of the video-coding area to the client 20.

Steps (A) through (E) are described in detail below.

Referring again to FIG. 1, the band estimation unit 106 measures round trip time (RTT) of the network between the server 10 and the client 20 at predetermined intervals and estimates a maximum data rate. For example, the band estimation unit 106 transmits a packet called an ICMP Echo Request to the client 20 at an interval of several seconds (e.g., five seconds), and waits for an ICMP Echo Reply from the client 20. When receiving the ICMP Echo Reply from the client 20, the band estimation unit 106 calculates time difference between the transmission of the ICMP Echo Request and the reception of the ICMP Echo Reply, and sets the time difference as the RTT.

To estimate a maximum data rate, the mechanism of the transmission control protocol (TCP), which is a widely-used network communication protocol, may be used. In TCP, a buffer called a window is defined. A receiving end reports the size of its window (window size) to a sending end to notify the amount of data that can be transmitted without receiving an acknowledgement from the receiving end. After transmitting data up to the window size, the sending end cannot transmit additional data until an acknowledgement is received from the receiving end.

Generally, the window size is set at 64 KB (kilobyte). In a network such as a LAN where RTT is short, the window size does not cause any practical problem. However, in a network such as a wide area network (WAN) where RTT is long (e.g., 50 ms or longer), the data rate for each TCP connection is limited by the window size. For example, when the RTT of a network is 50 ms, only 64 KB of data can be transmitted in 50 ms. In other words, only 1280 KB of data can be transmitted per second for each TCP connection (i.e., about 10 Mbps).

The band estimation unit 106 estimates a current maximum data rate of the network based on RTT according to the above described mechanism of TCP. The band estimation unit 106 reports the estimated maximum data rate to the filtering unit 107.

The filtering unit 107 receives operation commands from the operation information obtaining unit 111, filters the operation commands according to conditions, and outputs the filtered operation commands to the OS execution control unit 11a. For example, the filtering unit 107 compares the current maximum data rate of the network estimated by the band estimation unit 106 with a predetermined filtering threshold (second threshold). When the maximum data rate is less than the filtering threshold, the filtering unit 107 thins out operation commands of a predetermined type at a given rate. For example, commands such as mouse drag commands that cause frequent screen updates are determined as the operation commands of the predetermined type.

Here, let us assume that the filtering threshold is 5 Mbps. In this case, when the estimated maximum data rate is greater than or equal to 5 Mbps, the filtering unit 107 outputs all of the operation commands to the OS execution control unit 11a. Meanwhile, when the estimated maximum data rate is, for example, 4 Mbps (less than 5 Mbps), the filtering unit 107 calculates a thin-out rate according to formula (1) below.

Thin-out rate=1−(maximum data rate/filtering threshold)     formula (1)

In this example, the thin-out rate is 1−(⅘)=⅕.

In this case, the filtering unit 107 removes one out of every five mouse drag commands, and outputs the remaining mouse drag commands to the OS execution control unit 11a. The filtering unit 107 also outputs the thin-out rate to the threshold changing unit 108.

The threshold changing unit 108 changes the threshold (first threshold) used to determine a frequently-changed area based on the thin-out rate used (or calculated) by the filtering unit 107. For example, the threshold changing unit 108 decreases the threshold at the same rate as the thin-out rate received from the filtering unit 107.

Let us assume that the threshold takes the default value of 5 when the thin-out rate received from the filtering unit 107 is 0. When the thin-out rate is changed, the threshold changing unit 108 changes the threshold according to formula (2) below.

Changed threshold=original threshold×(1−thin-out rate)     formula (2)

For example, when the thin-out rate is changed from 0 to ⅕, the threshold is changed to 5×(1−⅕)=4. The threshold changing unit 108 sets the changed threshold "4" obtained by formula (2) in the frequently-changed area identifying unit 132.

With the above configuration, the server 10 can remove some of the operation commands of a predetermined type according to the maximum data rate and thereby eliminate drawing processes corresponding to the removed operation commands to reduce the processing load. For example, the operation commands of the predetermined type may be rotation commands in a computer-aided design (CAD) application.

The server 10 can also change the threshold for determining a frequently-changed area based on a thin-out rate. This in turn makes it possible to detect an area as a frequently-changed area even when its change count is decreased to a value below the original threshold as a result of thinning out operation commands. With this configuration, the server 10 can continuously suppress the amount of data transmitted to the client 20.

The OS execution control unit 11a, the application execution control unit 11b, the graphics driver 12, and the server-side remote screen control unit 14 may be implemented by integrated circuits and electronic circuits. Also, some of the functional units of the server-side remote screen control unit 14 may be implemented as a separate integrated circuit or electronic circuit. Examples of integrated circuits include an application specific integrated circuit (ASIC) and a field programmable gate array (FPGA).

Examples of electronic circuits include a central processing unit (CPU) and a micro processing unit (MPU).

EXAMPLE

Figure 8:
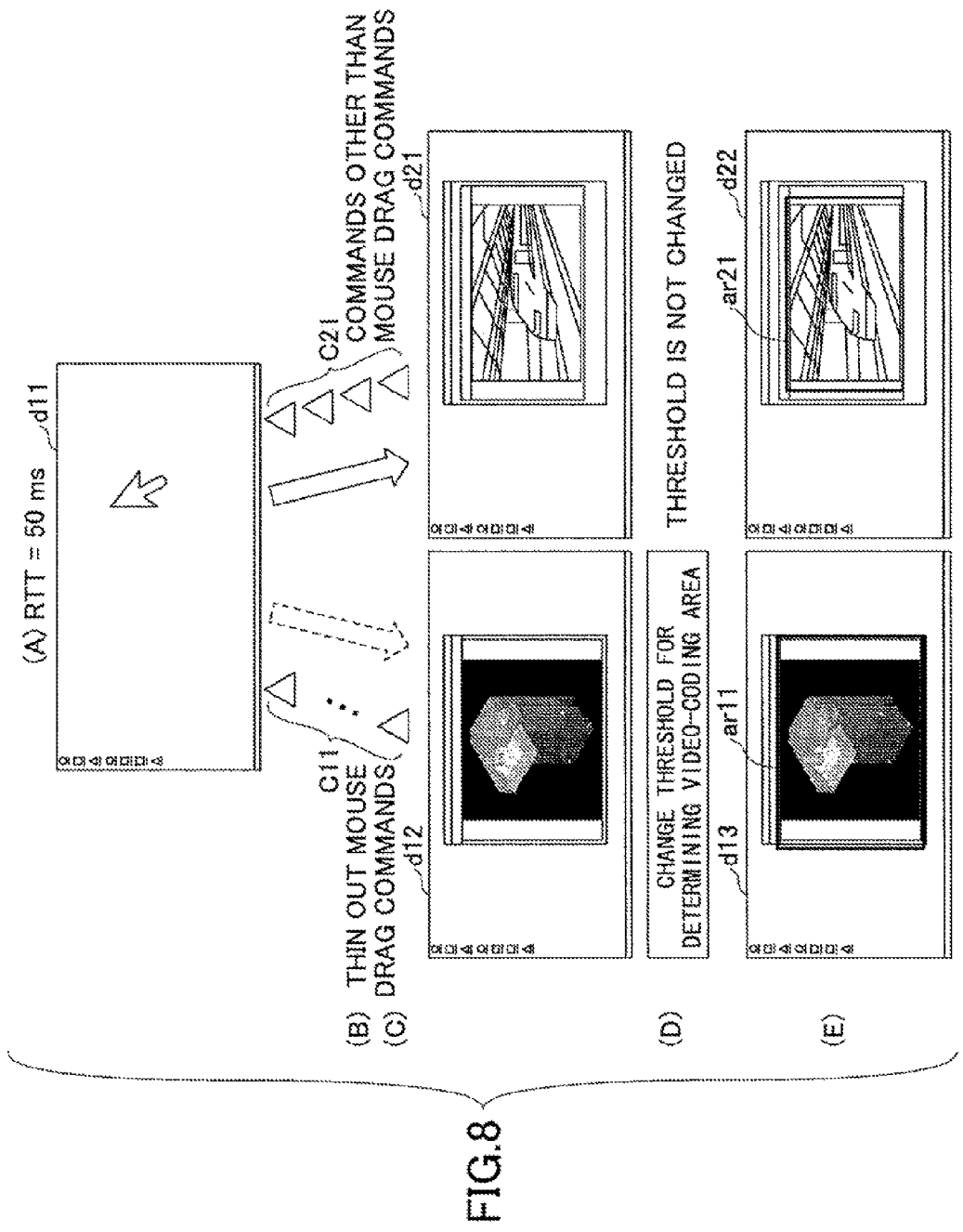
FIG. 8 is a drawing used to describe examples of a command filtering and threshold changing process.

An exemplary command filtering and threshold changing process is described below. FIG. 8 is a drawing used to describe an exemplary command filtering and threshold changing process. In the example of FIG. 8, the band estimation unit 106 estimates a maximum data rate according to formula (3) below at the timing of a display screen d11. In this example, it is assumed that the RTT is 50 ms. Here, to prevent delays in transmitting screen data and operation commands, multiple connections may be established between one server and one client and data may be divided and transmitted via the multiple connections to increase the maximum data rate. For this reason, it is preferable to take into account not only RTT but also the number of connections.

Maximum data rate=64×(1000/RTT)×n     formula (3)

n: number of connections

The process of FIG. 8 branches based on whether moving operations of the mouse or other operations are performed at the client 20.

When moving operations of the mouse are performed, mouse drag commands C11 are transmitted to the server 10. When the maximum data rate is less than the filtering threshold, the filtering unit 107 thins out the mouse drag commands C11. At the timing of a display screen d12, a window is opened and processes related to the movement of the window are thinned out.

When the mouse drag commands C11 are thinned out, the threshold changing unit 108 changes the threshold used by the video-coding area determining unit 103 to determine a video-coding area (frequently-changed area) according to formula (2). The video-coding area determining unit 103 determines whether there is a video-coding area in the display screen based on the changed threshold. In a display screen d13 of FIG. 8, an area ar11 is determined to be a video-coding area.

Meanwhile, when operations other than moving operations of the mouse are performed, commands C21 (other than the mouse drag commands C11) are transmitted to the server 10. In this case, the filtering unit 107 outputs the commands C21 without change to the OS execution control unit 11a. Then, the basic process described above is performed. At the timing of a display screen d21, a window is opened and processes corresponding to the commands C21 are performed. In a display screen d22, an area ar21 is determined to be a video-coding area.

<Configuration of Client>

Next, an exemplary configuration of the client 20 of the first embodiment is described. As illustrated in FIG. 1, the client 20 may include an input unit 21, a display unit 22, and a client-side remote screen control unit 23. The client 20 may also include other functional units such as a sound output unit that a known computer normally includes.

The input unit 21 is an input device that receives various types of information such as instructions for the client-side remote screen control unit 23. For example, the input unit 21 may be implemented by a keyboard and a mouse. The mouse functions as a pointing device on the display unit 22.

The display unit 22 displays various types of information such as display screens transmitted from the server 10. For example, the display unit 22 may be implemented by a monitor, a display, or a touch panel.

The client-side remote screen control unit 23 receives the remote screen control service provided by the server 10 via the client-side remote screen control application. As illustrated in FIG. 1, the client-side remote screen control unit 23 may include a communication unit 201, a first decoder 202, a first display control unit 203, a second decoder 204, and a second display control unit 205.

The communication unit 201 performs data communications with the server 10. The communication unit 201 may include an operation information reporting unit 211, a first reception unit 212, and a second reception unit 213.

The operation information reporting unit 211 reports operation information input via the input unit to the server 10. For example, the operation information reporting unit 211 reports operation information indicating a right click, a left click, a double click, or dragging of the mouse, or the amount of movement of a mouse cursor obtained based on a moving operation of the mouse. As another example, the operation information reporting unit 211 may report operation information indicating the amount of rotation of a mouse wheel or the type of a key pressed on the keyboard.

The first reception unit 212 receives encoded data and attribute information of a rectangular update image transmitted from the first transmission unit 112 of the server 10. For example, the first reception unit 212 outputs the received encoded data to the first decoder 202.

The first decoder 202 decodes the encoded data of the rectangular update image received by the first reception unit 212. The first decoder 202 employs a decoding algorithm corresponding to the encoding algorithm used by the server 10.

The first display control unit 203 causes the display unit 22 to display the rectangular update image obtained by decoding the encoded data by the first decoder 202. For example, the first display control unit 203 displays the rectangular update image (bitmap image) in a screen area of the display unit 22 which corresponds to the position and size of the rectangular update image indicated by the attribute information received by the first reception unit 212.

Also, the first display control unit 203 performs a process as described below when attribute information of a frequently-changed area is received by the first reception unit 212. The first display control unit 203 sets a screen area of the display unit 22 which corresponds to the position and size of the frequently-changed area indicated by the attribute information as a blank area where no bitmap image is to be displayed.

The second reception unit 213 receives an encoded image and attribute information of a frequently-changed area transmitted from the second transmission unit 113 of the server 10.

The second decoder 204 decodes the encoded image of the frequently-changed area received by the second reception unit 213. The second decoder 204 employs a decoding algorithm corresponding to the encoding algorithm used by the server 10.

The second display control unit 205 causes the display unit 22 to display the decoded image of the frequently-changed area output from the second decoder 204 based on the attribute information received by the second reception unit 213. For example, the second display control unit 205 displays the decoded image of the frequently-changed area in a screen area of the display unit 22 which corresponds to the position and size of the frequently-changed area indicated by the attribute information.

The client-side remote screen control unit 23 may be implemented by an integrated circuit or an electronic circuit. Also, some of the functional units of the client-side remote screen control unit 23 may be implemented as a separate integrated circuit or electronic circuit. Examples of integrated circuits include an ASIC and an FPGA. Examples of electronic circuits include a CPU and an MPU.

<Operations>

Exemplary operations of the server 10 and the client 20 of the thin client system 1 are described below. First, operations of the server 10 are described.

<Process Performed by Server>

Figure 9:
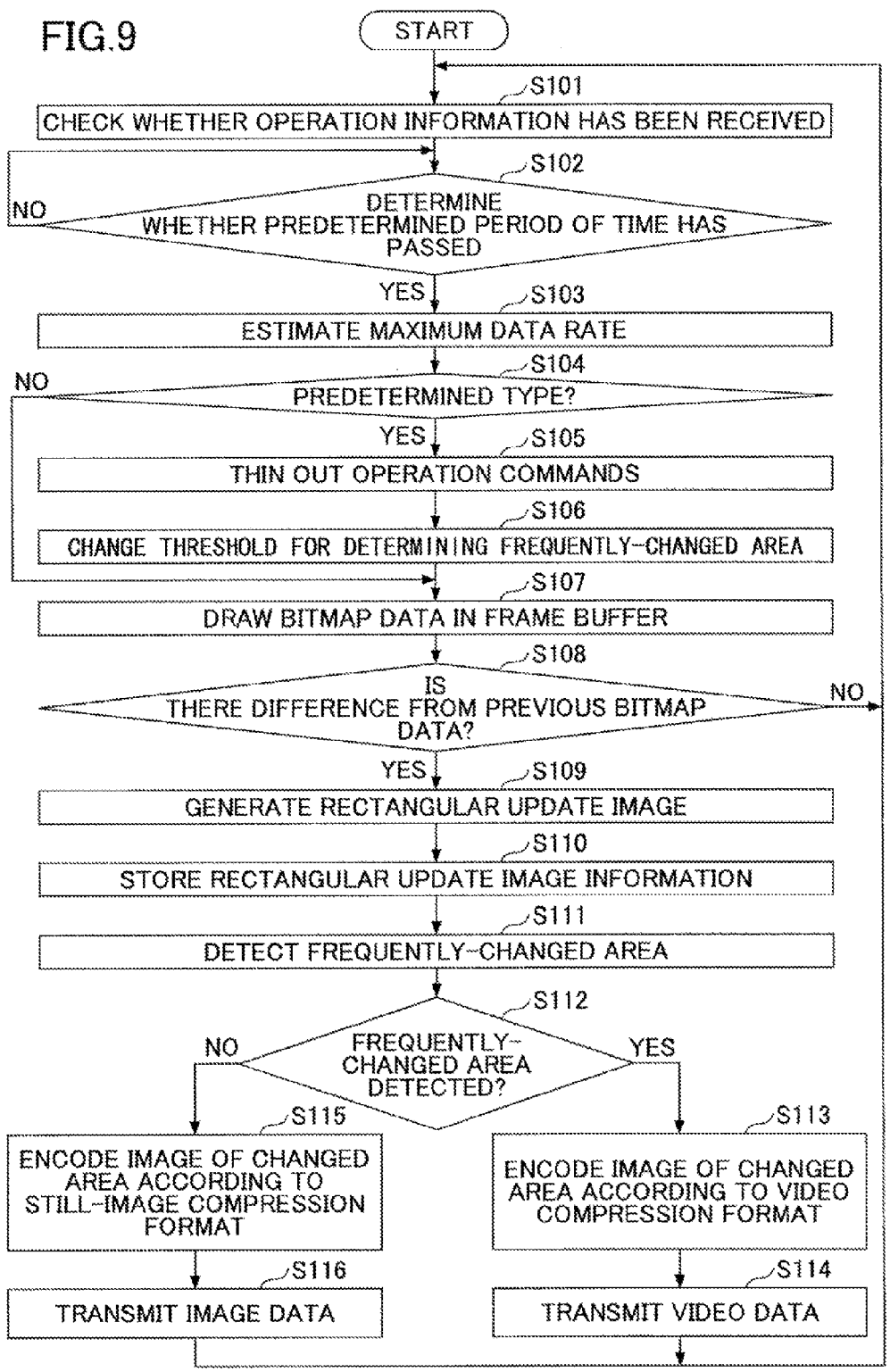
FIG. 9 is a flowchart illustrating an exemplary process performed by a server according to the first embodiment.

FIG. 9 is a flowchart illustrating an exemplary process performed by the server 10 according to the first embodiment. In step S101 of FIG. 9, the operation information obtaining unit 111 checks whether operation information has been received from the client 20.

In step S102, the band estimation unit 106 determines whether a predetermined period of time has passed. When the predetermined period of time has passed (YES in step S102), the process proceeds to step S103. Meanwhile, when the predetermined period of time has not passed yet (NO in step S102), step S102 is repeated.

In step S103, the band estimation unit 106 estimates a maximum data rate based on RTT and formula (3) described above.

In step S104, the filtering unit 107 determines whether operation commands in the operation information received from the client 20 are of a predetermined type. For example, the operation commands of the predetermined type may be mouse drag commands. When the operation commands are of the predetermined type (YES in step S104), the process proceeds to step S105. Meanwhile, when the operation commands are not of the predetermined type (NO in step S104), the process proceeds to step S107.

In step S105, the filtering unit 107 thins out the operation commands of the predetermined type based on a thin-out rate obtained according to formula (1) described above.

In step S106, the threshold changing unit 108 changes the threshold for determining a frequently-changed area (video-coding area) and sets the changed threshold in the frequently-changed area identifying unit 132.

In step S107, bitmap data reflecting user operations are drawn in the frame buffer 13 by the OS execution control unit 11a, the application execution control unit 11b, and the graphics driver 12.

In step S108, the image generation unit 102 determines whether there are differences between the bitmap data drawn in the frame buffer 13 and the previous bitmap data. When there are differences (YES in step S108), the process proceeds to step S109. Meanwhile, when there is no difference (NO in step S108), the process returns to step S101.

In step S109, the image generation unit 102 generates rectangular update images for areas corresponding to the differences, i.e., areas of the display screen image to be updated.

In step S110, the change frequency determining unit 131 accumulates rectangular update image information including the positions and sizes of the rectangular update images and change counts.

In step S111, the frequently-changed area identifying unit 132 detects a changed area (frequently-changed area) whose change count within a predetermined period of time is greater than the threshold.

In step S112, the frequently-changed area identifying unit 132 determines whether a frequently-changed area has been detected. When a frequently-changed area has been detected (YES in step S112), the process proceeds to step S113. Meanwhile, when no frequently-changed area has been detected (NO in step S112), the process proceeds to step S115.

In step S113, the second encoder 105 encodes images of the changed area (i.e., the frequently-changed area) according to a video compression format to generate video data. In other words, images of the frequently-changed area are converted into a video.

In step S114, the second transmission unit 113 transmits the video data of the changed area to the client 20.

In step S115, the first encoder 104 encodes images of changed areas (i.e., rectangular update images) according to a still-image compression format to generate image data.

In step S116, the first transmission unit 112 transmits the image data of the changed areas to the client 20. Some of the above steps are described in more detail below.

<Process Performed by Band Estimation Unit>

Figure 10:
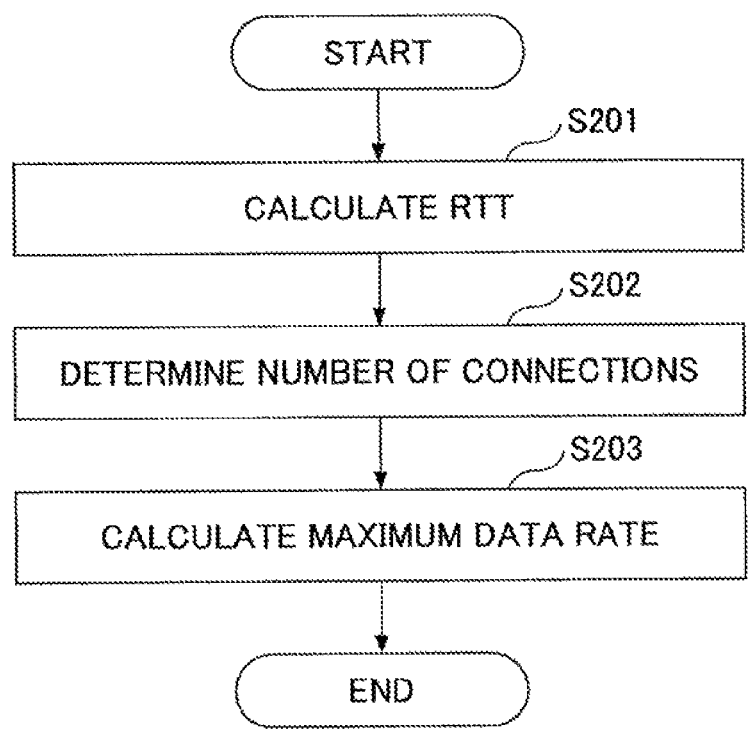
FIG. 10 is a flowchart illustrating an exemplary process performed by a band estimation unit according to the first embodiment.

FIG. 10 is a flowchart illustrating an exemplary process performed by the band estimation unit 106 of the first embodiment. The process of FIG. 10 corresponds to step S103 of FIG. 9. In step S201, the band estimation unit 106 calculates RTT. In step S202, the band estimation unit 106 determines the number of connections.

In step S203, the band estimation unit 106 calculates a maximum data rate using formula (3) described above.

<Process Performed by Filtering Unit>

Figure 11:
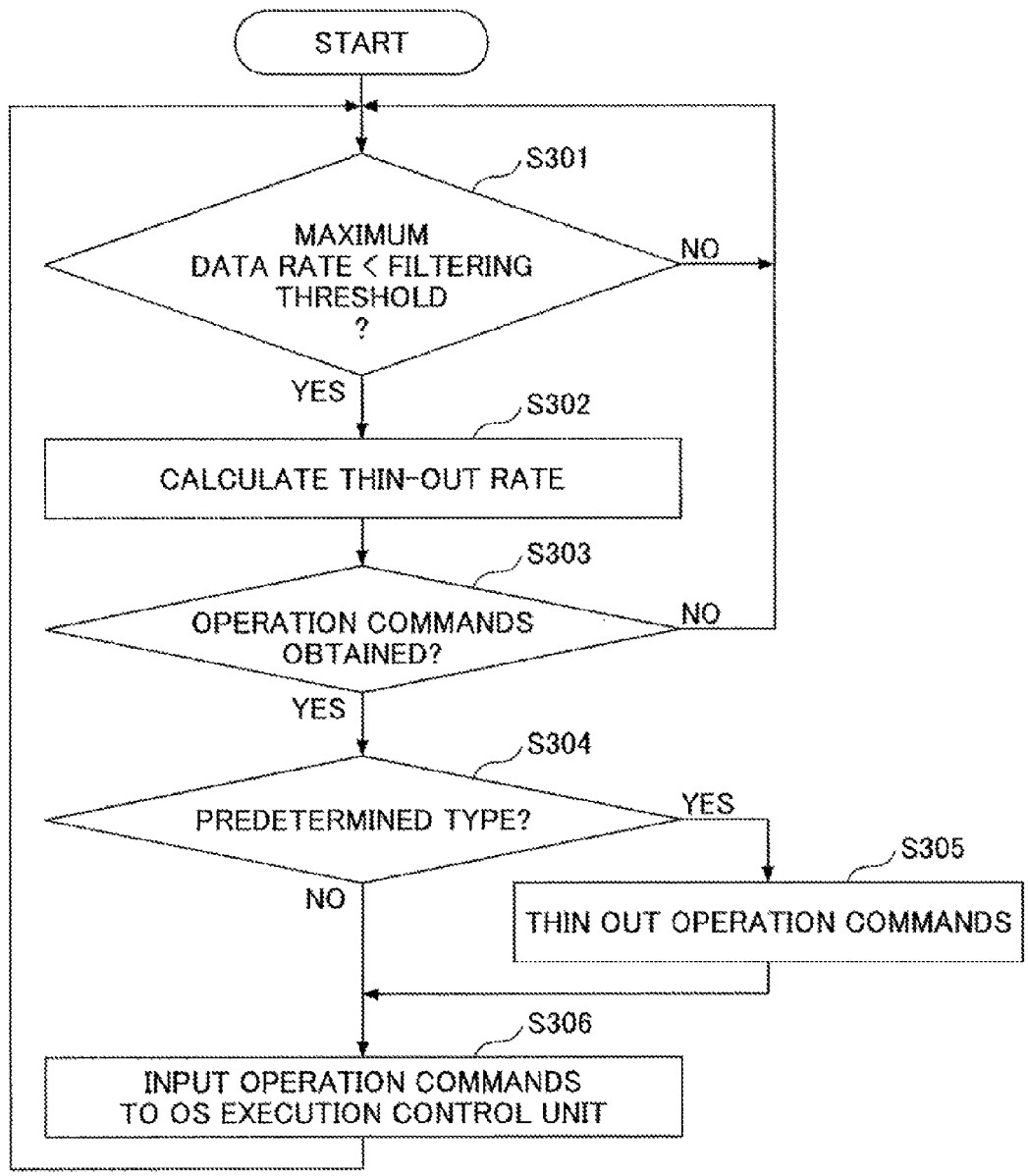
FIG. 11 is a flowchart illustrating an exemplary process performed by a filtering unit according to the first embodiment.

FIG. 11 is a flowchart illustrating an exemplary process performed by the filtering unit 107 of the first embodiment. The process of FIG. 11 corresponds to steps S104 and S105 of FIG. 9. In step S301, each time a maximum data rate is received from the band estimation unit 106, the filtering unit 107 determines whether the maximum data rate is less than a filtering threshold (second threshold). When the maximum data rate is less than the filtering threshold (YES in step S301), the process proceeds to step S302. Meanwhile, when the maximum data rate is greater than or equal to the filtering threshold (NO in step S301), the process returns to step S301.

In step S302, the filtering unit 107 calculates a thin-out rate using formula (1) described above. In step S303, the filtering unit 107 determines whether operation commands have been received from the operation information obtaining unit 111. When operation commands have been received (YES in step S303), the process proceeds to step S304. Meanwhile, when no operation command has been received (NO in step S303), the process returns to step S301.

In step S304, the filtering unit 107 determines whether the operation commands are of a predetermined type. When the operation commands are of the predetermined type (YES in step S304), the process proceeds to step S305. Meanwhile, when the operation commands are not of the predetermined type (NO in step S304), the process proceeds to step S306.

In step S305, the filtering unit 107 performs a thin-out process to thin out the operation commands of the predetermined type based on the calculated thin-out rate.

In step S306, the filtering unit 107 inputs the operation commands to the OS execution control unit 11a.

The above process makes it possible to thin out operation commands that cause frequent screen updates and thereby reduce the processing load of the server 10.

<Process Performed by Threshold Changing Unit>

Figure 12:
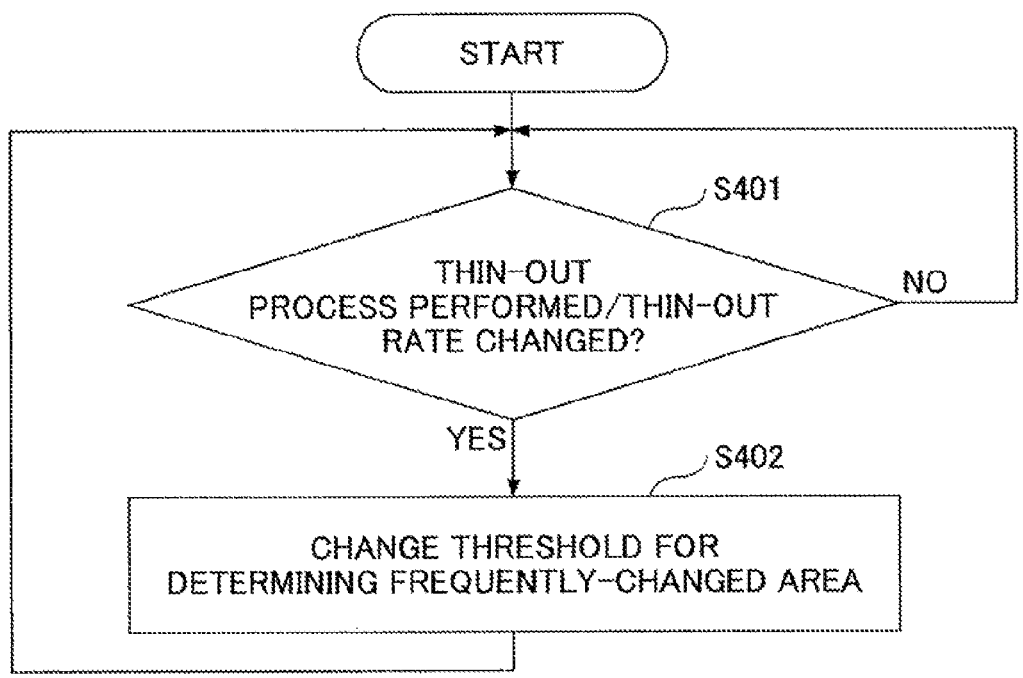
FIG. 12 is a flowchart illustrating an exemplary process performed by a threshold changing unit according to the first embodiment.

FIG. 12 is a flowchart illustrating an exemplary process performed by the threshold changing unit 108 of the first embodiment. The process of FIG. 12 corresponds to step S106 of FIG. 9. In step S401 of FIG. 12, the threshold changing unit 108 determines whether a thin-out process has been newly performed or finished or the thin-out rate has been changed by the filtering unit 107. When it is determined that a thin-out process has been newly performed or finished or the thin-out rate has been changed (YES in step S401), the process proceeds to step S402. Meanwhile, when it is determined that no thin-out process has been newly performed or finished and the thin-out rate has not been changed (NO in step S401), the process returns to step S401.

In step S402, the threshold changing unit 108 changes the threshold for determining a frequently-changed area (video-coding area) and reports the changed threshold to the frequently-changed area identifying unit 132.

This process makes it possible to determine a frequently-changed area (video-coding area) based on an appropriate threshold even when operation commands have been thinned out.

<Process Performed by Client>

Figure 13:
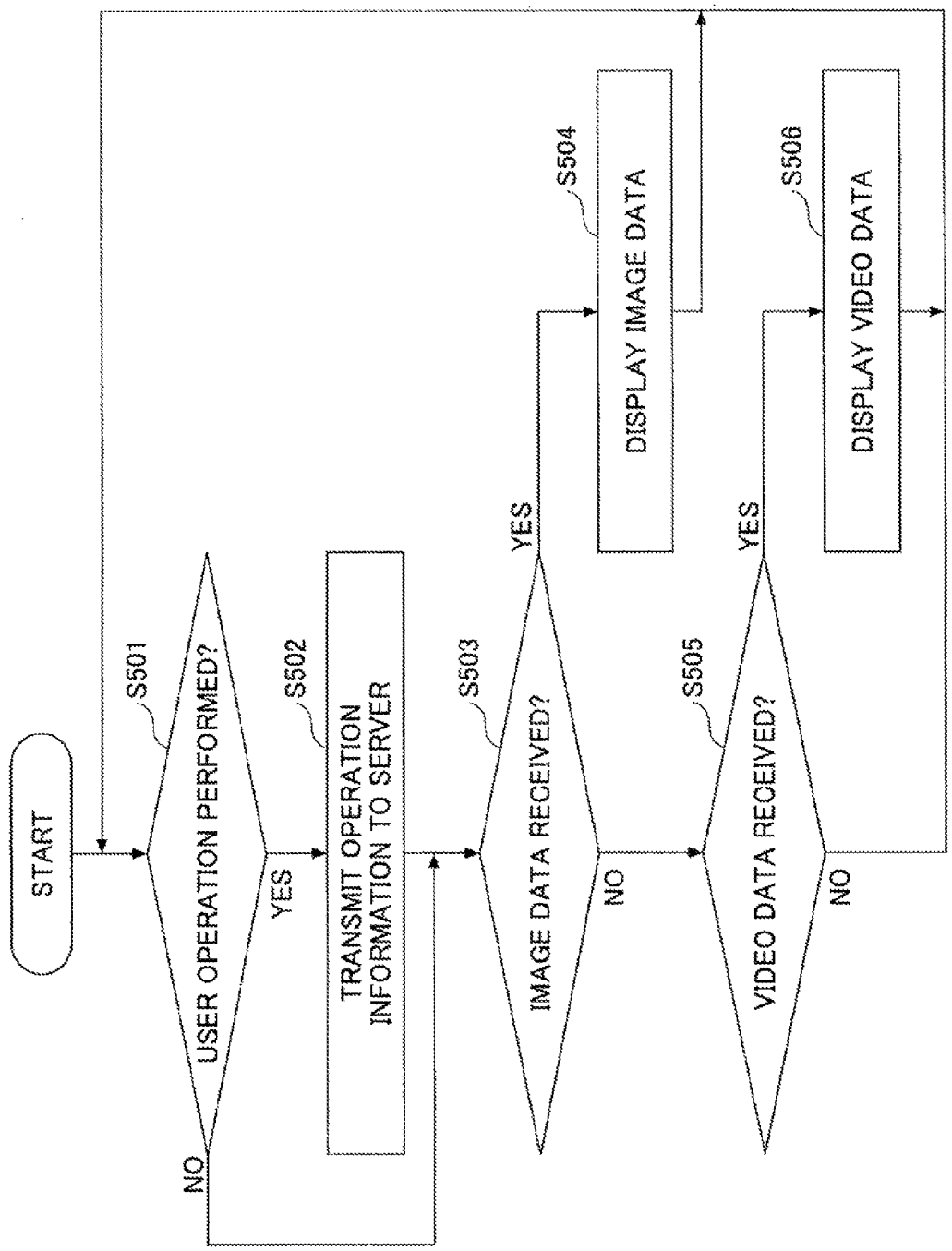
FIG. 13 is a flowchart illustrating an exemplary process performed by a client.

FIG. 13 is a flowchart illustrating an exemplary process performed by the client 20 according to the first embodiment. In step S501 of FIG. 13, the input unit 21 determines whether a user operation such as a mouse operation or a key input has been performed. When a user operation has been performed (YES in step S501), the process proceeds to step S502. Meanwhile, when no user operation has been performed (NO in step S501), the process proceeds to step S503.

In step S502, the operation information reporting unit 211 transmits operation information indicating the user operation to the server 10.

In step S503, the first reception unit 212 determines whether image data have been received. When image data have been received (YES in step S503), the process proceeds to step S504. Meanwhile, when no image data have been received (NO in step S503), the process proceeds to step S505.

In step S504, the first decoder 202 decodes the image data, and the first display control unit 203 displays the decoded image data at the corresponding position on the display unit 22.

In step S505, the second reception unit 213 determines whether video data have been received. When video data have been received (YES in step S505), the process proceeds to step S506. Meanwhile, when no video data have been received (NO in step S505), the process returns to step S501.

In step S506, the second decoder 204 decodes the video data, and the second display control unit 205 displays the decoded video data at the corresponding position on the display unit 22.

As described above, the first embodiment makes it possible to reduce the processing load of a server and reduce the amount of data to be transmitted without degrading the responsiveness of a thin client system.

Second Embodiment

Next, a thin client system according to a second embodiment is described. In the second embodiment, a server further includes an update data rate calculation unit 302 that calculates the data rate of data to be transmitted to a client and sets the calculated data rate as a filtering threshold. The data rate of data to be transmitted to a client may be referred to as an "update data rate".

When the filtering threshold is set at a value that is greater than the actual data rate, drawing processes (i.e., operation commands) are thinned out even when it is not necessary and as a result, the number of frames per second (FPS) is reduced. Meanwhile, when the filtering threshold is set at a value that is less than the actual data rate, drawing processes (i.e., operation commands) may not be thinned out even when it is necessary.

For the above reasons, in the second embodiment, an average of update data rates is calculated at predetermined intervals, and the average update data rate is set as the filtering threshold (first threshold) to properly perform a thin-out process for operation commands.

In the first embodiment, the band estimation unit 106 estimates a maximum data rate based on RTT. However, the maximum data rate may be affected by the performance of a server and a network in addition to RTT. Accordingly, even when a maximum data rate calculated based solely on RTT is greater than the filtering threshold, the data rate of actually transmitted data may be less than the calculated maximum data rate due to other factors.

For the above reason, a band estimation unit 301 of the second embodiment measures, in addition to RTT, the data rate of data actually transmitted. The data rate of data actually transmitted may be referred to as an "actual data rate". The band estimation unit 301 compares the update data rate and the actual data rate to obtain a difference between them and when the difference is greater than a predetermined value, sets the actual data rate as the maximum data rate.

In other words, when there is a large difference between the update data rate and the actual data rate, the actual data rate is set as the maximum data rate. This configuration makes it possible to more appropriately filter (or thin out) operation commands based on an actual value.

<System>

Figure 14:
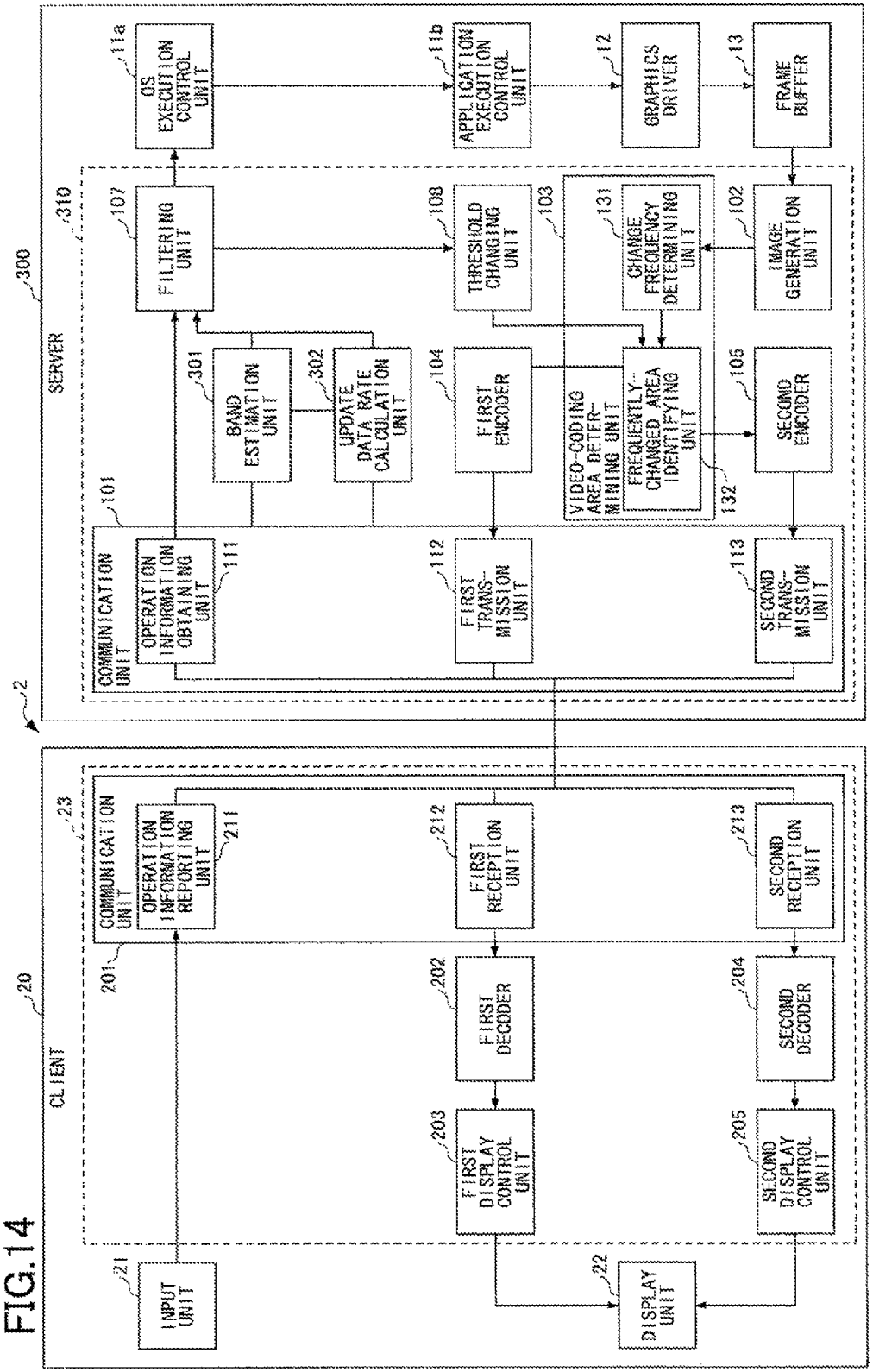
FIG. 14 is a block diagram illustrating exemplary configurations of a server and a client in a thin client system according to a second embodiment.

A thin client system 2 according to the second embodiment is described below. FIG. 14 is a block diagram illustrating exemplary configurations of a server 300 and the client 20 in the thin client system 2 according to the second embodiment.

In the thin client system 2, the server 300 remotely controls screens displayed by the client 20. The configurations of the thin client system 2 are substantially the same as those of the thin client system 1 of FIG. 1 except the configuration of the server 300. The server 300 is described below.

<Configuration of Server>

An exemplary configuration of the server 300 of the second embodiment is described below. As illustrated in FIG. 14, the server 300 includes an OS execution control unit 11*a*, an application execution control unit 11*b*, a graphics driver 12, a frame buffer 13, and a server-side remote screen control unit 310. The server 300 may also include other functional units such as input units (or devices) and display units (or devices) that a known computer normally includes. The same reference numbers as in FIG. 1 are assigned to the corresponding components in FIG. 14, and descriptions of those components are omitted here.

The same reference numbers as those assigned to the corresponding components of the server-side remote screen control unit 14 of FIG. 1 are assigned to components other than the band estimation unit 301 and the update data rate calculation unit 302 of the server-side remote screen control unit 310.

The update data rate calculation unit 302 obtains, from the first transmission unit 112 and the second transmission unit 113, data rates (update data rates) of data to be transmitted to the client 20, and calculates a average of update data rates (hereafter referred to as an "average update data rate") within a predetermined period of time. The update data rate calculation unit 302 sets the calculated average update data rate as a filtering threshold used by the filtering unit 107.

The update data rate calculation unit 302, for example, calculates an average update data rate (e.g., 3 Mbps) within the latest 10 seconds, and sets the average update data rate as a filtering threshold used by the filtering unit 107. This enables the filtering unit 107 to perform a thin-out process based on an appropriate filtering threshold.

The band estimation unit 301 may be configured to change the maximum data rate based on the average update data rate calculated by the update data rate calculation unit 302. For example, the band estimation unit 301 measures the data rate (actual data rate) of data actually transmitted from the first transmission unit 112 and the second transmission unit 113, and compares the actual data rate with the average update data rate.

When the difference between the actual data rate and the average update data rate is greater than or equal to a predetermined value, the band estimation unit 301 sets the actual data rate as the maximum data rate and reports the maximum data rate to the filtering unit 107. For example, when the predetermined value is 500 kbps, the average update data rate within a predetermined period of time is 3 Mbps, and an average actual data rate within the same period of time is 2 Mbps, the difference between the average update data rate and the average actual data rate is 1 Mbps and is greater than 500 kbps (predetermined value).

In this case, the band estimation unit 301 sets the average actual data rate (2 Mbps) as the maximum data rate and reports the maximum data rate to the filtering unit 107. This enables the filtering unit 107 to perform a thin-out process based on an appropriate maximum data rate.

<Operations>

Next, exemplary operations of the server 300 of the thin client system 2 are described. Operations of the client 20 are substantially the same as those described in the first embodiment, and therefore their descriptions are omitted here.

<Process Performed by Server>

The server 300 performs a process that is similar to the process illustrated in FIG. 9 except that an average update data rate is set as the filtering threshold and actual data rates are taken into account in calculating the maximum data rate. Processes of setting the filtering threshold and the maximum data rate in the second embodiment are described below.

<Filtering Threshold Setting Process>

Figure 15:
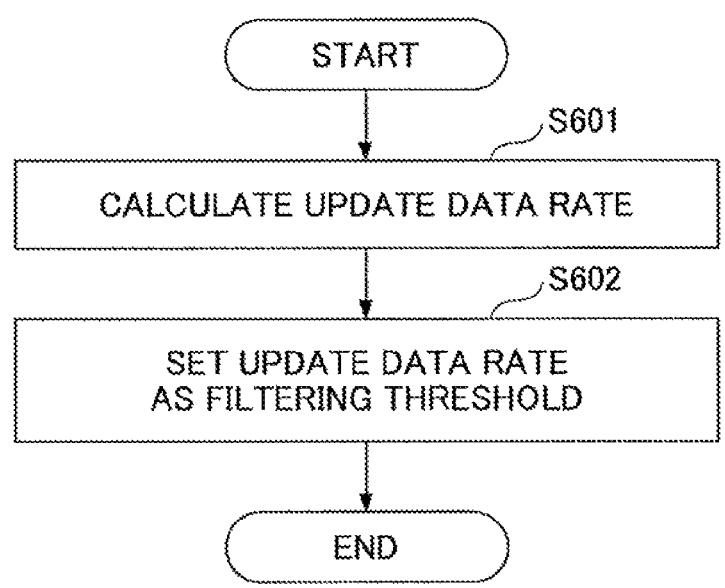
FIG. 15 is a flowchart illustrating an example of a filtering threshold setting process according to the second embodiment.

FIG. 15 is a flowchart illustrating an example of a filtering threshold setting process according to the second embodiment. The process of FIG. 15 is performed in parallel with step S103 of FIG. 9.

In step S601, the update data rate calculation unit 302 calculates an average update data rate every predetermined period of time (e.g., every five seconds).

In step S602, the update data rate calculation unit 302 reports the calculated average update data rate to the filtering unit 107 where the average update data rate is set as the filtering threshold.

This configuration makes it possible to set an appropriate filtering threshold and thereby properly perform a thin-out process.

<Process of Setting Maximum Data Rate>

Figure 16:
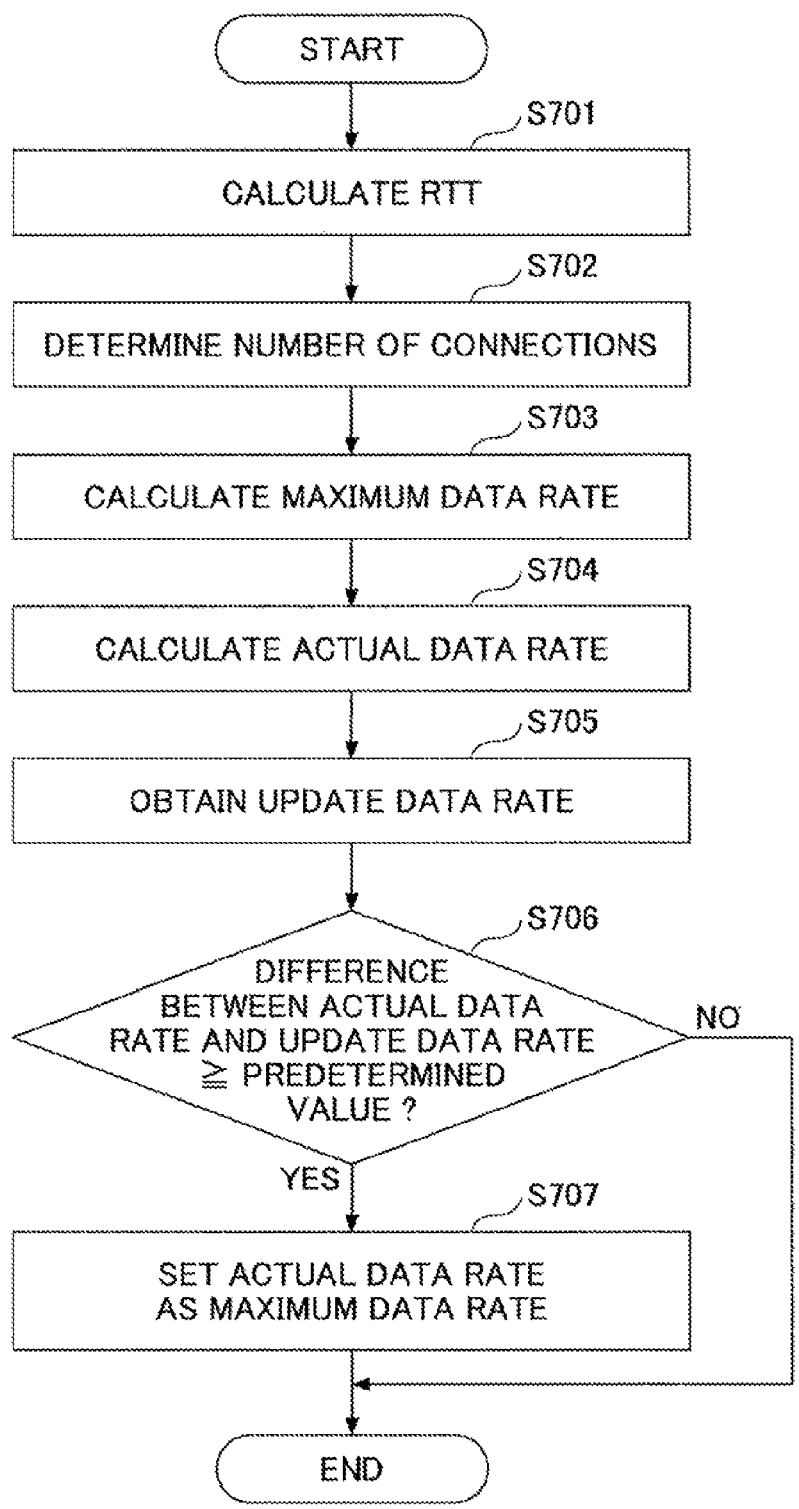
FIG. 16 is a flowchart illustrating an exemplary process of setting a maximum data rate according to the second embodiment.

FIG. 16 is a flowchart illustrating an exemplary process of setting a maximum data rate according to the second embodiment. The process of FIG. 16 corresponds to step S103 of FIG. 9.

Since steps S701 through S703 are substantially the same as steps S201 through S203 of FIG. 10, their descriptions are omitted here.

In step S704, the band estimation unit 301 calculates an average actual data rate indicating an average data rate of data actually transmitted to the client 20 within a predetermined period of time.

In step S705, the band estimation unit 301 obtains the average update data rate from the update data rate calculation unit 302.

In step S706, the band estimation unit 301 determines whether the difference between the average actual data rate and the average update data rate is greater than or equal to a predetermined value. When the difference is greater than or equal to the predetermined value (YES in step S706), the process proceeds to step S707. Meanwhile, when the difference is less than the predetermined value (NO in step S706), the maximum data rate calculated in step S703 is used (and the process ends).

In step S707, the band estimation unit 301 sets the average actual data rate as the maximum data rate and reports the maximum data rate to the filtering unit 107.

This configuration makes it possible to change the maximum data rate based on the average actual data rate, and thereby makes it possible to perform a thin-out process based on the maximum data rate that more accurately reflects the actual network conditions.

Thus, the second embodiment makes it possible to set an appropriate filtering threshold and thereby properly perform a thin-out process. Also, the second embodiment makes it possible to set the maximum data rate taking into account actual data rates and thereby makes it possible to more properly perform a thin-out process.

Example

FIG. 17 is a block diagram illustrating an exemplary configuration of an information processing apparatus 400. The information processing apparatus 400 is an example of an apparatus that can be used to implement the server 10, the server 300, and the client 20 described above. As illustrated in FIG. 17, the information processing apparatus 400 may include a control unit 401, a memory 402, a secondary storage unit 403, a drive unit 404, a network interface (I/F) 406, an input unit 407, and a display unit 408. These components are connected to each other via a bus to enable transmission and reception of data.

The control unit 401 is a central processing unit (CPU) that controls other components of the information processing apparatus 400 and performs calculations and data processing. The control unit 401 also executes programs stored, for example, in the memory 402 and the secondary storage unit 403. The programs perform the processes described in the above embodiments.

In other words, the control unit 401 can perform the processes and implement the functional units described in the above embodiments by executing the programs.

The memory 402 may be implemented, for example, by a read-only memory (ROM) or a random access memory (RAM), and retains or temporarily stores data and programs such as basic software (operating system (OS)) and application software to be executed by the control unit 401.

The secondary storage unit 403 may be implemented by a hard disk drive (HDD), and stores, for example, data related to application software.

The drive unit 404 reads programs from a storage medium 405 and installs the programs in the memory 402 and/or the secondary storage unit 403.

The programs stored in the storage medium 405 are installed in the image processing apparatus 404 via the drive unit 404. The installed programs can be executed by the image processing apparatus 400.

The network I/F 406 is an interface that allows the information processing apparatus 400 to communicate with other devices including communication functions and connected via a network, such as a local area network (LAN) or a wide area network (WAN), implemented by wired and/or wireless data communication channels.

The input unit 407 may include a keyboard including cursor keys, numeric keys, and function keys, and a mouse or a trackpad for selecting an item on a screen displayed on the display unit 408. Thus, the input unit 407 is a user interface that allows the user to input, for example, instructions and data to the control unit 401.

The display unit 408 may be implemented by, for example, a cathode ray tube (CRT) display or a liquid crystal display (LCD), and displays data received from the control unit 401.

The processes described in the above embodiments may be implemented as programs that are executable by a computer. Such programs may be downloaded from a server and installed in a computer.

Alternatively, the programs may be stored in a non-transitory, computer-readable storage medium such as the storage medium 405, and may be read from the storage medium into a computer or a portable device. For example, storage media such as a compact disk read-only memory (CD-ROM), a flexible disk, and a magneto-optical disk that record information optically, electrically, or magnetically, and semiconductor memories such as a ROM and a flash memory that record information electrically may be used as the storage medium 405. The storage medium 405 does not indicate a carrier wave. Further, the processes described in the above embodiments may be implemented by one or more integrated circuits.

The input unit 407 may be implemented by sensors such as an acceleration sensor, an optical sensor, a magnetic field sensor, and a temperature sensor that can detect the environment surrounding the user and user operations. The input unit 407 may also be implemented by devices such as a touch panel, a keyboard, and a microphone that the user can directly enter information and instructions.

In the above embodiments, it is assumed that the client 20 is implemented by a desktop terminal that can output a screen with the same size as that of a screen output by the server 10,300. However, the client 20 may also be implemented by a terminal with a smaller screen size such as a personal digital assistant (PDA), a notebook PC, a portable game device, or a portable music player. In this case, the size of a screen output from the server 10,300 may be reduced for display on the terminal. The OS execution control unit 11a of the server 10,300 is independent of any specific architecture or operating system.

In a thin client system, in addition to a word processing application and a Web browser, a CAD application may be available. In a CAD application, data called wireframes are used to generate, for example, images of printed circuit boards and 3D models. After images are generated using wireframes, a process called rendering may be performed on the images to generate more detailed image data. Also, a process may be performed to view the wireframes from various angles to inspect the images for errors.

Therefore, when a CAD application is used on a thin client system, it is necessary to transmit a large amount of data. When an application that involves transmission of a large amount of data is used, transmitting entire screen data of the application without change may consume, for example, several hundred Mbps of the network bandwidth.

The above embodiments make it possible to compress image data for transmission. Also, the above embodiments make it possible to change the data rate of compressed image data taking into account the trade-off between the image quality and the data rate.

There is an increasing demand to use mobile terminals such as notebook PCs and tablet terminals as thin clients instead of or in addition to desktop PCs. However, the performance of mobile terminals is generally lower than the performance of desktop PCs. For this reason, when compressed screen update data are transmitted from a server to a mobile terminal, the mobile terminal may not be able to decompress the screen update data in real time and the drawing process may be delayed.

The above embodiments make it possible to reduce the amount of screen data to be transmitted and thereby reduce the load of drawing screen data at a server and a client. This in turn makes it possible to use mobile terminals in a thin-client system.

Thus, the above embodiments may be applied to a system where a client or a user terminal receives a display screen of a desktop environment via a network from a server.

The above embodiments may also be applied to a case where a CAD application is used in a desktop environment. For example, when a user opens 3D object data and rotates the object data by dragging it with a mouse, a large amount of data needs to be transmitted to update the screen of a client. The above embodiments may also be applied to a case that involves transmission of such a large amount of data.

The above embodiments may also be applied to a case where applications other than a CAD application are used. For example, the above embodiments may be applied to a case where frequent screen updates occur as a result of dragging operations using a mouse.

In the above embodiments, mouse drag commands are used as operation commands of a predetermined type that are thinned out by the filtering unit 107. However, commands of any other type may be filtered by the filtering unit 107. For example, scroll commands generated by upward/downward/leftward/rightward scrolling operations using a mouse or a cursor key may be filtered by the filtering unit 107.

Similarly to the case of mouse drag commands, the display screen is updated once for each scroll command. For example, when a scrolling operation is performed on a Web browser, the entire page being displayed is scrolled in a specific direction and an area in the display screen corresponding to the entire page needs to be updated.

Accordingly, when a large number of scroll commands are input to the OS execution control unit 11a, a large amount of data needs to be transmitted to update the display screen. This is particularly true for applications such as Microsoft® Word and Microsoft® Excel that display contents in a specific window area.

Thus, the filtering unit 107 may be configured to filter (or thin out) scroll commands in addition to mouse drag commands. The thin-out process for scroll commands is substantially the same as that for mouse drag commands. Scrolling operations may be performed, for example, via the input unit 21.

When the number of frames drawn at a server is simply reduced to reduce the frame rate and reduce the processing load of a client, a video-coding area (or a frequently-changed area) may not be properly identified and the amount of data to be transmitted may not be effectively reduced. In the above embodiments, to prevent this problem, the server 10,300 is configured to estimate a maximum data rate of a network, to thin out operation commands of a predetermined type according to a thin-out rate obtained based on the maximum data rate, and to change a threshold used to determine a video-coding area (or a frequently-changed area) based on the thin-out rate. This configuration makes it possible to properly identify a video-coding area and effectively reduce the amount of data to be transmitted.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus connected via a network to a terminal, the information processing apparatus comprising:
   a processor configured to execute a process including
      generating an image that is changed according to operation commands received from the terminal and to be displayed at the terminal;
      identifying, in the image, a video-coding area that is changed within a predetermined period of time for a number of times greater than a first threshold and to be encoded according to a video compression format;
      estimating a maximum data rate based on a round trip time of the network between the information processing apparatus and the terminal;
      thinning out the operation commands according to a thin-out rate when the operation commands are of a predetermined type and the estimated maximum data rate is less than a second threshold; and
      changing the first threshold based on the thin-out rate when the operation commands of the predetermined type are thinned out.

2. The information processing apparatus as claimed in claim 1, wherein the process further includes
   calculating, at predetermined intervals, an average of first data rates of data to be transmitted from the information processing apparatus to the terminal and setting the average as the second threshold.

3. The information processing apparatus as claimed in claim 2, wherein the process further includes
   measuring a second data rate of data actually transmitted from the information processing apparatus to the terminal, and
   setting the second data rate as the maximum data rate when a difference between the second data rate and the average of the first data rates is greater than or equal to a predetermined value.

4. A method performed by an information processing apparatus connected via a network to a terminal, the method comprising:
   generating an image that is changed according to operation commands received from the terminal and to be displayed at the terminal;
   identifying, in the image, a video-coding area that is changed within a predetermined period of time for a number of times greater than a first threshold and to be encoded according to a video compression format;
   estimating a maximum data rate based on a round trip time of the network between the information processing apparatus and the terminal;
   thinning out the operation commands according to a thin-out rate when the operation commands are of a predetermined type and the estimated maximum data rate is less than a second threshold; and
   changing the first threshold based on the thin-out rate when the operation commands of the predetermined type are thinned out.

5. The method as claimed in claim 4, further comprising:
   calculating, at predetermined intervals, an average of first data rates of data to be transmitted from the information processing apparatus to the terminal and setting the average as the second threshold.

6. A non-transitory computer-readable storage medium storing program code for causing an information processing apparatus connected via a network to a terminal to perform a method, the method comprising:

generating an image that is changed according to operation commands received from the terminal and to be displayed at the terminal;

identifying, in the image, a video-coding area that is changed within a predetermined period of time for a number of times greater than a first threshold and to be encoded according to a video compression format;

estimating a maximum data rate based on a round trip time of the network between the information processing apparatus and the terminal;

thinning out the operation commands according to a thin-out rate when the operation commands are of a predetermined type and the estimated maximum data rate is less than a second threshold; and changing the first threshold based on the thin-out rate when the operation commands of the predetermined type are thinned out.

* * * * *